United States Patent
Shimizu et al.

(10) Patent No.: US 7,773,163 B2
(45) Date of Patent: Aug. 10, 2010

(54) REFLECTIVE LIQUID CRYSTAL DISPLAY DEVICE AND PROJECTION DISPLAY APPARATUS USING THE SAME

(75) Inventors: Shigeo Shimizu, Kanagawa-ken (JP); Takashi Moroboshi, Kanagawa-ken (JP); Masahiro Matsumaru, Kanagawa-ken (JP); Tetsuji Suzuki, Kanagawa-ken (JP)

(73) Assignee: Victor Company of Japan, Ltd., Kanagawa-ken (JP)

( * ) Notice: Subject to any disclaimer, the term of this patent is extended or adjusted under 35 U.S.C. 154(b) by 0 days.

(21) Appl. No.: 12/457,722

(22) Filed: Jun. 19, 2009

(65) Prior Publication Data

US 2009/0256976 A1     Oct. 15, 2009

Related U.S. Application Data

(62) Division of application No. 11/498,899, filed on Aug. 4, 2006, now Pat. No. 7,643,053.

(30) Foreign Application Priority Data

Aug. 4, 2005    (JP) ............................ 2005-226586
Jan. 10, 2006   (JP) ............................ 2006-001958

(51) Int. Cl.
   *G02F 1/1335*    (2006.01)
(52) U.S. Cl. .................. 349/9; 349/1; 349/5; 349/8; 349/56; 349/84
(58) Field of Classification Search ............... 349/1, 349/5, 8, 9, 56, 84, 113
   See application file for complete search history.

(56) References Cited

U.S. PATENT DOCUMENTS 5,877,831 A    3/1999    Leenhouts et al.
6,147,735 A    11/2000   Yamazaki et al.

(Continued)

FOREIGN PATENT DOCUMENTS

JP    2-236523    9/1990

(Continued)

OTHER PUBLICATIONS

"Reflective Liquid Crystal Displays" by Shin-Tson Wu and Deng-ke Yang; John Wiley & Son, Ltd., Jan. 1, 2001.

(Continued)

*Primary Examiner*—Jennifer Doan
(74) *Attorney, Agent, or Firm*—Clark & Brody

(57) ABSTRACT

A reflective liquid crystal display device combined with an optical system with a wire grid is provided for light modulation by a liquid crystal layer. This layer, made of nematic liquid crystal having negative dielectric anisotropy, is formed such that first and second orientation directions on first and second substrates are rotated by "60±α" and "60±β" degrees in first and second rotating directions starting from a reference direction, respectively. The first and second rotating directions are mutually opposite, the reference direction is parallel to the first and second substrates and within in an angular range defined by a central angle plus ±5 degrees wherein the central angle is ±45 degrees from an oscillation direction of incident polarized light, and a relationship of $|\alpha|+|\beta| \leq 10$ ($\alpha$ and $\beta$ are zero or positive integers) is fulfilled.

10 Claims, 21 Drawing Sheets

U.S. PATENT DOCUMENTS

| | | |
|---|---|---|
| 6,175,399 B1 | 1/2001 | Mitsui et al. |
| 6,400,510 B1 * | 6/2002 | Chen .................. 359/626 |
| 6,532,048 B1 | 3/2003 | Matsui |
| 6,784,960 B1 | 8/2004 | Van De Witte et al. |
| 6,879,431 B2 | 4/2005 | Ide |
| 6,954,247 B2 | 10/2005 | Chaudhari et al. |
| 7,221,420 B2 | 5/2007 | Silverstein et al. |
| 2001/0045999 A1 | 11/2001 | Nakazawa et al. |
| 2002/0036606 A1 | 3/2002 | Ichikawa et al. |
| 2003/0142257 A1 | 7/2003 | Chaudhari et al. |
| 2003/0179426 A1 | 9/2003 | Ide |
| 2004/0165128 A1 | 8/2004 | Vithana |
| 2004/0179158 A1 | 9/2004 | Silverstein et al. |
| 2004/0257508 A1 | 12/2004 | Van De Witte et al. |
| 2005/0062920 A1 | 3/2005 | Chaudhari et al. |
| 2005/0105027 A1 | 5/2005 | Wada et al. |
| 2005/0206846 A1 * | 9/2005 | Yeung et al. .................. 353/20 |
| 2006/0139535 A1 | 6/2006 | Van De Witte et al. |
| 2006/0203164 A1 | 9/2006 | Silverstein et al. |

FOREIGN PATENT DOCUMENTS

| | | |
|---|---|---|
| JP | 2002-072217 | 3/2002 |

OTHER PUBLICATIONS

"P-155: High Performance Contrast Enhancing Films for VAN-Mode LCoS Panels" by Markus Duelli et al.; SID 05 Digest; pp. 892-895.

* cited by examiner

[ISOLUMINANCE CONTOUR]

REFLECTIVE LIQUID CRYSTAL DISPLAY DEVICE AND PROJECTION DISPLAY APPARATUS USING THE SAME

CROSS REFERENCES TO RELATED APPLICATIONS

The present application is a divisional of U.S. patent application Ser. No. 11/498,899 filed on Aug. 4, 2006 and relates to and incorporates by reference Japanese Patent applications No. 2005-226586 filed on Aug. 4, 2005 and No. 2006-001958 filed on Jan. 10, 2006.

BACKGROUND OF THE INVENTION

1. Field of the Invention

The present invention relates to a reflective liquid crystal display device incorporated in image display apparatuses and a projection display apparatus using the reflective liquid crystal display device, and is in particular, to the device and apparatus which are able to display high-contrast images.

2. Description of the Related Art

In recent years, projection display apparatuses with liquid crystal display devices have been grown into popular tools that can be used as large-sized screen display apparatuses. Such display apparatuses, which can be used for various things, such as meetings with screen presentation, home theaters, and other uses, have been developed on various types of display devices. One type of such display apparatuses is a display apparatus with a reflective liquid crystal display device incorporated therein.

This reflective liquid crystal display device has two substrates and a liquid crystal layer, where one substrate has a surface with a transparent electrode formed thereon and the other substrate has a surface on which reflective electrodes and drive circuits for respective pixels are arranged in a matrix and both surfaces of the two substrates are opposed in parallel to each other to sandwich the liquid crystal therebetween as a layer. In this display device, the drive circuits for the liquid crystal can be embedded beneath the display pixels, so that the display pixels allow the projection display apparatus to present images with high spatial resolution and high brightness.

The liquid crystal display device utilizes the double refraction of the liquid crystal molecules to control the transmission of light passing therethrough. This means that the way the liquid crystal molecules are oriented has a large influence on the display quality of the images. Taking this fact into account, a variety of types of orientation ways for liquid crystal, which are on different operation modes, have also been studied and proposed for the reflective liquid crystal display device. One proposal is provided by "Shin-Tson Wu and Deng-Ke Yang,""Reflective Liquid Crystal Displays," JOHN WILEY & SONS, Ltd, published Jan. 1, 2001." This reference provides each orientation technique (i.e., relationship among an oscillation direction of incident polarized light, incident-side liquid crystal orientation and pixel-side liquid crystal orientation) based on HFE (Hybrid Field Effect) mode, MTN (Mixed Twisted Nematic) mode, SCTN (Self-Compensated Twisted Nematic) mode and ECB (Electrically Controlled Birefringence) mode (refer to FIGS. 31A-31D of this application). In addition, Japanese Patent No. 2616014 and United State Patent Publication No. 2004/0165128 also provide other orientation techniques, which are shown in FIGS. 31E and 31F, respectively.

In the case of the orientation techniques on the above operation modes, a vertically aligned type of liquid crystal (on homeotropic aligned mode) provides high contrast and operates faster in the response speed than a horizontally aligned type of liquid crystal (on homogeneous aligned mode). Because of these features, this liquid crystal has attracted attention. In the horizontally aligned type of liquid crystal, the liquid crystal molecules are aligned substantially horizontally to the substrate surface when no voltage is applied between the substrates, whilst when a voltage is applied, the liquid crystal molecules align vertically to the substrate surface in response to its dielectric anisotropy. These alignments of the liquid crystal molecules produce black and white representations. However, though the liquid crystal molecules are ordered to be aligned vertically, some molecules positioned close to an orientation membrane formed on each substrate are held at angles which are near to the horizontal angle. This causes differences in phase of the molecules, thus deteriorating the level of black (e.g., deteriorating contrast in the black and while levels).

In contrast, the vertically aligned type of liquid crystal has a negative dielectric anisotropy, so that the liquid crystal molecules are aligned to a direction perpendicular to the substrate surface when no voltage is applied between the substrates. And, in response to an application of voltage, the molecules are made to be aligned horizontally along the substrate surface, providing high contrast and operating at a faster speed, with still less power consumption.

However, the vertically aligned type of liquid crystal still has some difficulties, which include disclination, for instance. To be specific, unless the liquid crystal molecules are respectively given a slight tilt (pre-tilt angle) in a certain direction in a state where there is no voltage application, respective molecules are flipped toward different directions, which is called disclination, thus causing a deterioration in image quality. As shown in FIG. 32, for example, the pre-tilt angle is given as an angle θp made between a long-axis direction of a liquid crystal molecule and the substrate surface in a state where no voltage is applied (meanwhile, the pre-tilt angle may be given as an angle θp' (=90 degrees−θp), which advances from the normal line to the substrate surface, as illustrated in FIG. 32.)

In FIG. 32, there is shown an azimuthal angle α made between an azimuth produced by projecting the long axis to the substrate surface and a predetermined axis on the substrate. A difference between the azimuth angles on both the upper and lower substrates (on the light incidence side and the pixel side) corresponds to a twist angle. For example, United State Patent Publication No. 2004/0165128 shows an orientation for liquid crystal, in which a pre-tilt angle θp is 75-88 degrees (in this reference, since the pre-tilt angle is given as an angle which advances from the normal line to the substrate, the pre-tilt angle is denoted as 2-15 degrees) and a twist angle φ is 90 degrees, as shown in FIG. 31F.

By the way, in using the reflective liquid crystal display device, giving the pre-tilt angle θp results in lowering the contrast of images to be displayed. That is, for realizing higher contrast, it is desired that the vertically aligned type of liquid crystal be used. In this liquid crystal, a pre-tilt angle θp is given to the molecules to prevent the disclination, but such a previous tilt-angle setting will cause shifts in phases of the molecules, which will invite deterioration in contrast of images.

One normal countermeasure against the above difficulty is to employ a phase compensator to compensate the phase shifts for accomplishing high contrast. This countermeasure is true of a structure where a polarizing beam splitter of either MacNeille type or wire grid type is used as a polarizing device. For the phase compensation, it is required for the phase compensator to have an A-component (a phase difference) having refractive anisotropy along the surface thereof.

On the other hand, in manufacturing the reflective liquid crystal display device, there arise irregularities (errors) in both the thickness of a liquid crystal layer and pre-tilt angles to be given, device by device, no matter what the precision for manufacturing is made higher. That is, such irregularities are inevitable. Therefore, an A-component (i.e., a phase difference caused due to differences in pre-tilt angles and thicknesses of liquid crystal layers) to be compensated varies depending on each device, so that it is almost impossible to use a phase compensator of which refractive anisotropy is set to an ideal value.

In addition, the liquid crystal has a refraction index depending on a wavelength dispersion characteristic and the refraction index itself has anisotropy also depending on the wavelength dispersion characteristic. Thus, for example, the shorter the wave length, the larger the anisotropy of the refraction index. Accordingly, it is necessarily required for the wavelength plate to have the capability of compensating the phase shifts at a degree which is decided by taking the wavelength dispersion characteristics into account. Necessarily, this way will lead to a narrower selection of materials for the phase compensator. This is another disadvantage.

SUMMARY OF THE INVENTION

The present invention has been made in consideration of the foregoing difficulties, and an object of the present invention is to provide a reflective liquid crystal display device and a projection display apparatus using the same, which, through the display device employs a vertically aligned type of liquid crystal and a beam splitter serving as a polarizing light system but is provided with no phase compensator for compensating in phase the A-component, are able to contribute to the display of high-contrast images, by providing the orientation conditions of liquid crystal at a predetermined range.

In order to realize the above object, as one aspect, the present invention provides a reflective liquid crystal display device comprising: a first substrate receiving polarized light and having a surface on which a transparent electrode is formed, a second substrate being disposed in parallel to the second substrate with a space left between the first and second electrodes, having thereon a matrix formation composed of both reflective electrodes and drive circuits for respective pixels, and reflecting the polarized light coming through the first substrate; and a liquid crystal layer composed of nematic liquid crystal having negative dielectric anisotropy and held between the first and second substrates for modulating the polarized light coming through the first substrate. A first liquid crystal orientation direction on the first substrate is set to an angle rotated by "60±α" degrees in a first rotating direction starting from a reference direction, and a second liquid crystal orientation direction on the second substrate is set to an angle rotated by "60±β" degrees in a second rotating direction starting from the reference direction. The first and second rotating directions mutually oppositely rotate from the reference direction. The reference direction is parallel to the first and second substrates and is within an angular range defined as a central angle plus ±5 degrees, wherein the central angle is ±45 degrees from an oscillation direction of the polarized light entering each substrate and a relationship of $|\alpha|+|\beta|\leq 10$ (variables α and β are zero or positive integers) is fulfilled.

As another aspect, the present invention provides a projection display apparatus comprises a light source radiating light; an illuminating optical system receiving the light radiated by the light source; a polarizing beam splitter polarizing the radiated light through the optical system to produce polarized light and separating modulated light and non-modulated light; a reflective liquid crystal display device receiving the polarized light to modulate the received polarized light in response to image signals so that the modulated light is produced and returning the modulated light to the polarizing beam splitter; and a projection lens receiving the modulated light separated by the polarizing beam splitter to project the modulated light to a display plane on which an image is displayed. The reflective liquid crystal display device is configured to have the same structure as one described above.

DETAILED DESCRIPTION OF PREFERRED EMBODIMENTS

In connection with FIGS. 1-30, various embodiments of both a reflective liquid crystal display device and a projection display apparatus according to the present invention will now be described.

First Embodiment

Referring to FIGS. 1-13, a first embodiment will now be described.

Figure 1:
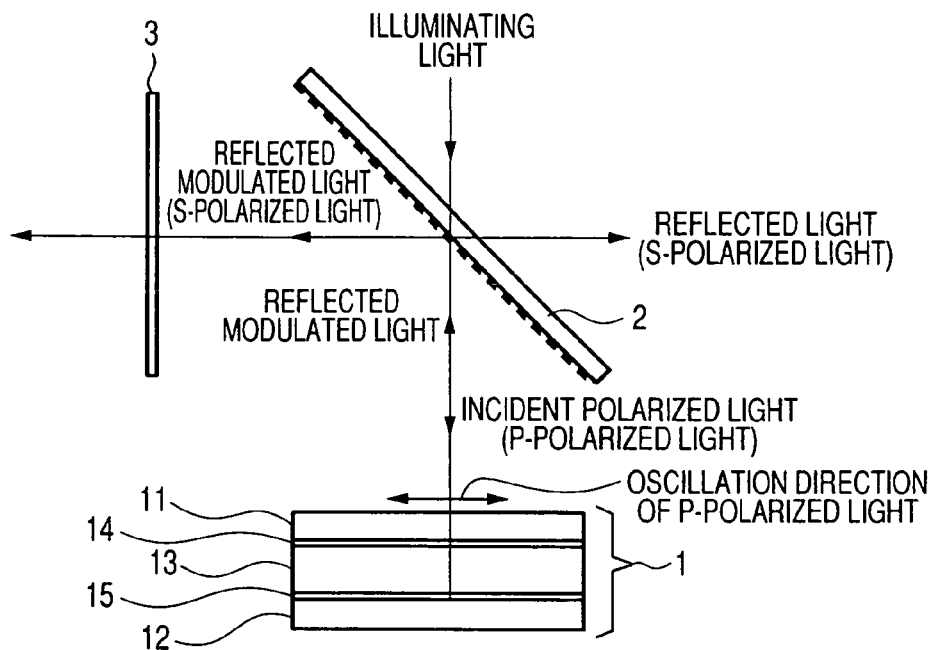
FIG. 1 is a schematic diagram showing an optical system composing a processor for a single color; the optical system being incorporated in a projection display apparatus employing a reflective liquid crystal display device according to a first embodiment of the present invention.

FIG. 1 shows a reflective type of optical system that serves as a processor for a single color, the processor composing part of a projection display apparatus (not shown in FIG. 1) which employs a reflective liquid crystal display device according to the present invention. As shown in FIG. 1, the single-color processor is provided with a reflective liquid crystal display device 1, a WG-PBS (wire grid type of polarizing beam splitter) 2, and a polarization plate 3 serving as an analyzer.

The WG-PBS 2 receives illuminating light that has come thereto. The illuminating light that has made incidence to the WG-PBS 2 is separated into P-polarized light which becomes incident light to the reflective liquid crystal display device 1 and S-polarized light which is reflected light. The P-polarized light, which has transmitted the splitter 2, enters the reflective light crystal display device 1. This device 1 modulates the incident P-polarized light in accordance with image signals, whereby the modulated light is reflected by the device 1 to return to the WG-PBS 2 as modulated reflection light. The WG-PBS 2 operates to reflect only the modulated S-polarized light, but causes the P-polarized light to be transmitted therethrough so that the P-polarized light becomes return light tracing back the path along which the illuminating light passed. In contrast, the modulated S-polarized light, which has been reflected by the WG-PBS 2, passes the polarization plate 3 to enter a color synthesizing prism (not shown), at which the modulated S-polarized light is synthesized with other modulated S-polarized light in conformity with the other two colors. The synthesized light then enters a projection lens (not shown) for displaying projected color images on a screen.

The reflective liquid crystal display device 1 will now be detailed. This device 1 is provided with a transparent substrate 11 which is a transparent electrode and an active matrix substrate 12 on which both reflective electrodes and drive circuits are mapped in a matrix for respective pixels. Both the substrates 11 and 12 are specially arranged to be opposed to each other. The reflective liquid crystal display device 1 is also provided with a liquid crystal layer (fluid) 13 held in a space sandwiched by both the substrates 11 and 12, and orientation membranes 14 and 15 to provide the liquid crystal with predetermined orientation conditions. The orientation membranes 14 and 15 are made from SiOx compound and are formed on surfaces of both the transparent substrate 11 and the active matrix substrate 12, which are exposed to the liquid crystal layer (fluid) 13, by the use of a surface processing technique on vapor deposition.

The liquid crystal layer (fluid) 13 is composed of nematic liquid crystal having negative dielectric anisotropy, a double refraction index $\Delta n$ of 0.085 under the condition that the wavelength of light is 550 nm (corresponding to green). The reflective liquid crystal display device 1 is set to be used in a normally black mode.

Figure 2:
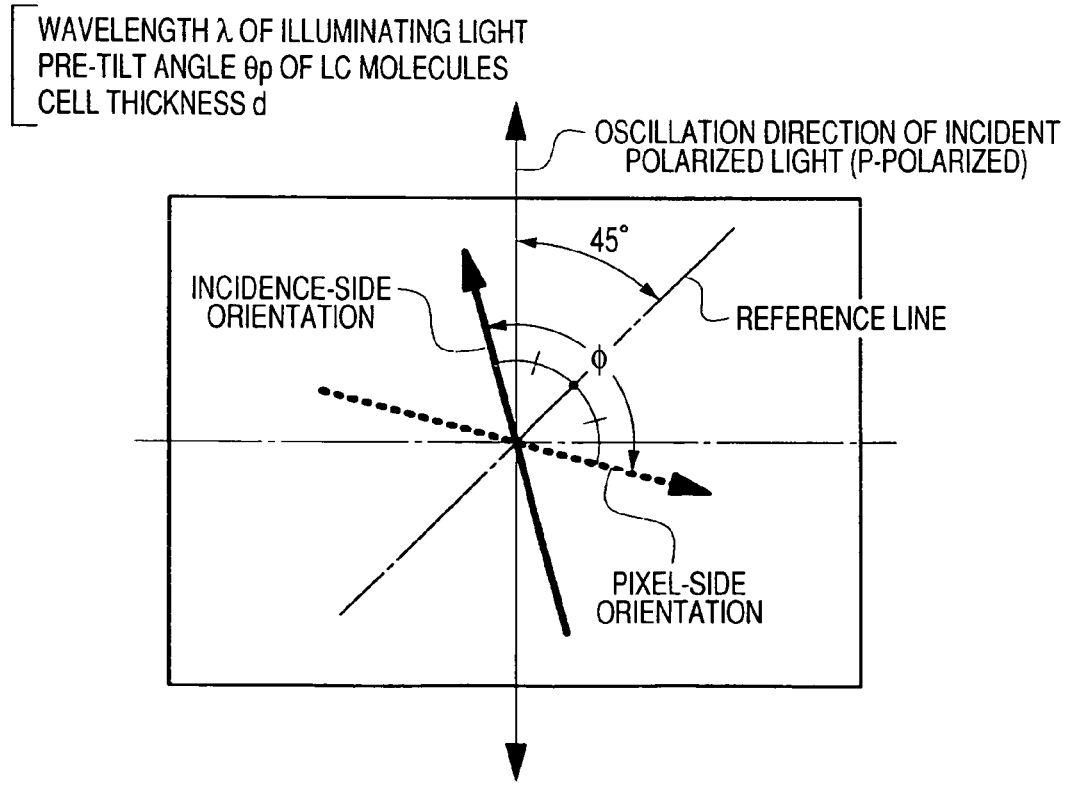
FIG. 2 shows the angular relationship between the oscillation direction of incident polarized light and both pixel-side liquid-crystal orientation direction and incidence-side liquid-crystal orientation direction.

In the foregoing single-color processor, the inventors conducted various experiments in which the wavelength $\lambda$ of the illuminating light, the pre-tilt angle $\theta p$ and the twist angle $\phi$ of the liquid crystal molecules, and the thickness d of the liquid crystal layer 13 in a direction perpendicular to the substrates (hereinafter, simply referred to as a "cell thickness") were changed to various values to measure, as an output, amounts of the reflection light (S-polarized light) which passes the polarization plate 3. The twist angle $\phi$ according to the various experiments is defined as an angle made between a pixel-side liquid-crystal orientation direction and an incidence-side liquid-crystal orientation direction, where, as illustrated in FIG. 2, the former and latter orientation directions are produced by making clockwise and counterclockwise rotations of $\phi/2$, respectively, from a central direction (defined as a reference direction and a line along this reference direction is called a reference line) decided by making a clockwise rotation of 45 degrees from the oscillation direction of the incident polarized light (P-polarized light).

Experiment 1

Figure 3:
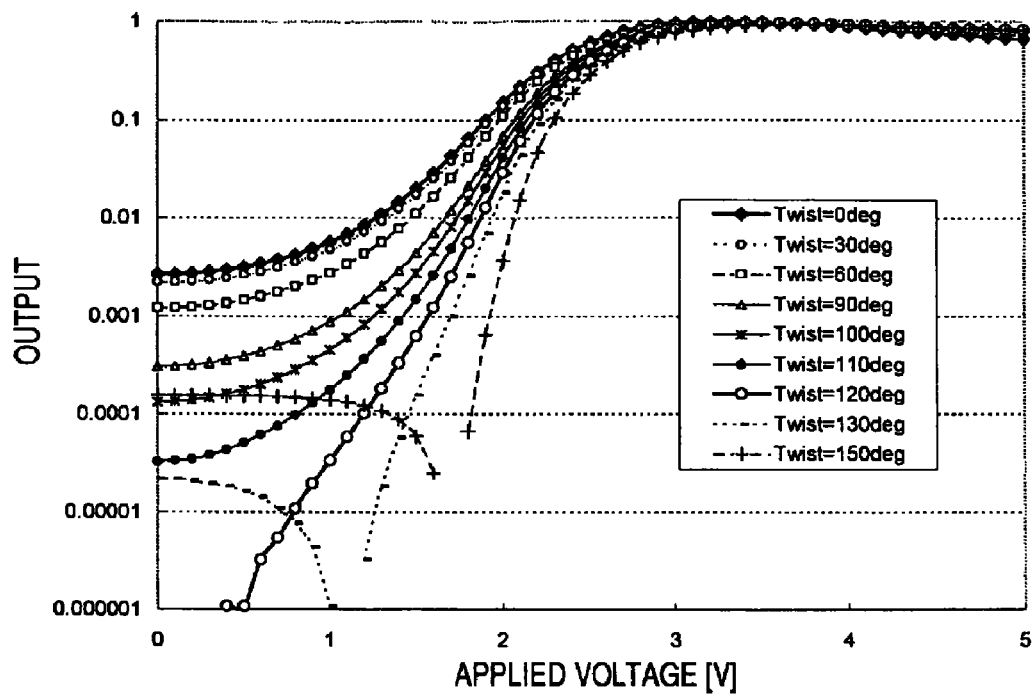
FIG. 3 is a graph showing an applied voltage vs. output (amount of light) characteristic of the reflective liquid crystal display device under the condition that the wavelength of illuminating lights the pre-tilt angle of liquid crystal molecules and a cell thickness are fixedly set and the twist angle of the liquid crystal molecules is assigned to a parameter to be changed.

Under the condition that the wavelength $\lambda$ of the illuminating light is 550 nm (green), the pre-tilt angle $\theta p$ of the liquid crystal molecules is 82 degrees, and the cell thickness d is 3.5 μm, the twist angle $\phi$ was designated as a parameter to be changed to 0, 30, 60, 90, 100, 110, 120, 130, and 150 degrees respectively. In each condition in which the twist angle $\phi$ was changed from one another, a voltage to be applied between the transparent substrate 11 and all the reflective electrodes on the active matrix substrate 12 was changed in a range of 0-5 Volts, during which time the amount of the reflected light (S-polarized) at the WG-PBS 2 was measured. Measured results are shown in FIG. 3 as an "applied voltage vs. output (light amount) characteristic" (in which the "output" is expressed with a logarithmic scale). As understood from the curves shown in FIG. 3, a twist angle $\phi$ of 120 degrees provides a maximum contrast. In the case of $\phi=110$ degrees, a contrast ratio of $10^4:1$ or more were obtained, while in the case of $\phi=130$ degrees, a contrast ratio which is slightly lower than $10^5:1$ was obtained at an applied voltage of 0 volt. In addition, at an applied voltage of 1 volt or thereabouts, the output (light amount) showed a local minimum, thus providing a contrast ratio of $10^6:1$ or more. In cases where, like the case of $\phi=130$ degrees, the contrast ratio has a local minimum at a specific applied voltage, it is allowed to set the specific voltage as a voltage giving the black level.

Further, a further experiment was conducted in the same configuration as the above on a configuration in which the WG-PBS 2 was replaced by a MacNeille type of beam splitter. Measured results were shown in FIG. 4, in which, at cone angles of the incident polarized light (P-polarized) of 10 degrees or higher, any twist angle $\phi$ exhibited contrast ratios which drastically reduced down to 200:1 or thereabouts. The reason for this drastic reduction in the contrast ratios is that the MacNeille type of beam splitter brings about a skew angle. In order to raise the contrast ratio, it was therefore necessary to place a quarter wave plate (i.e., phase compensator) correcting the A-component between the MacNeille type of beam splitter and the reflective liquid crystal display device.

Experiment 2

Figure 5:
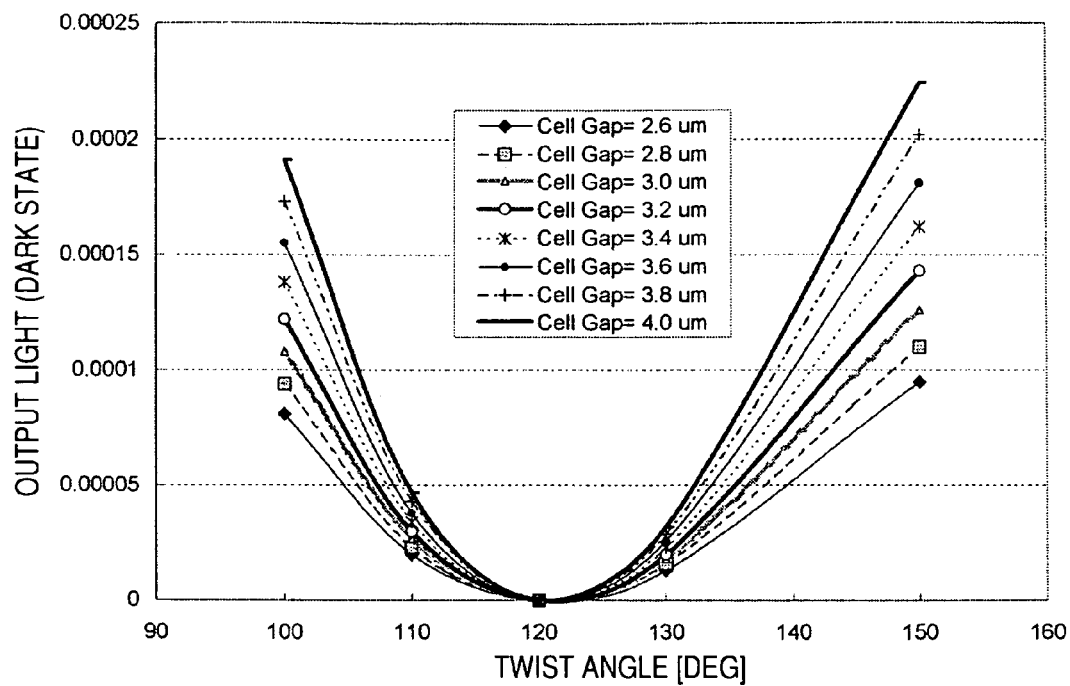
FIG. 5 is a graph showing the relationship between a twist angle of liquid crystal molecules and a contrast ratio in the reflective liquid crystal display device under the condition that the wavelength of illuminating light and the pre-tilt angle of liquid crystal molecules are fixedly set and a cell thickness is assigned to a parameter to be changed.

In an experiment 2, setting was made such that the wavelength was $\lambda=550$ nm (Green) and the pre-tilt angle was $\theta p=82$ degrees, while the cell thickness d was designated as a parameter to be changed every 0.2 μm in a range of 2.6-4.0 μm. In each condition in which the cell thickness d was changed, the twist angle $\phi$ was changed in a range of 100-150 degrees, during which time the brightness of black at an applied voltage of 0 volt and the brightness of white at an applied voltage of 5 volts were measured for a comparison between those brightness levels. Measured results are shown in FIG. 5, which exhibits that the black level always become a minimum at $\phi=120$ degrees regardless of changes in the cell thickness d and is relatively good in a range where the twist angle $\phi$ is 110-130 degrees.

Experiment 3

Figure 6:
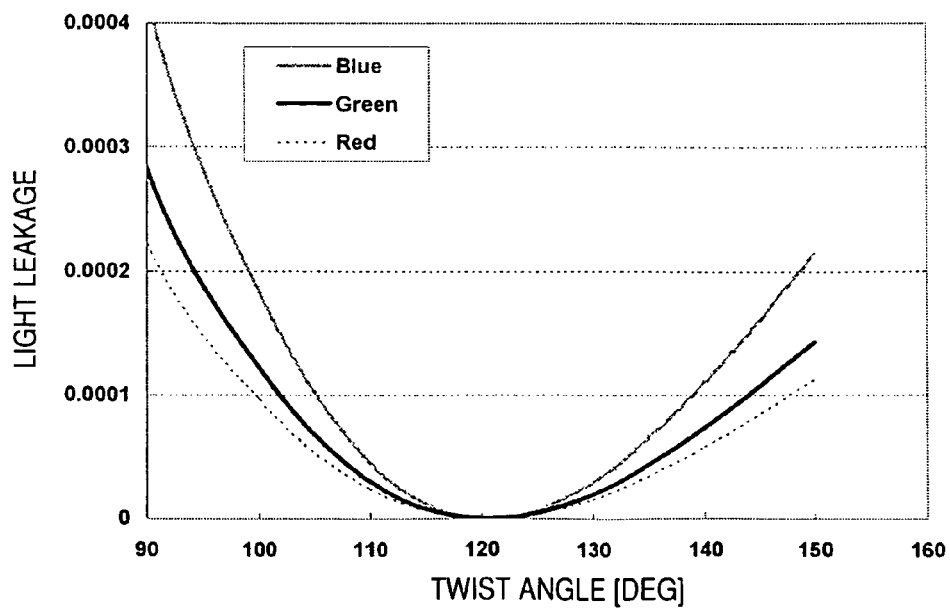
FIG. 6 is a graph showing the relationship between a twist angle of liquid crystal molecules and a black level in the reflective liquid crystal display device under the condition that the pre-tilt angle of liquid crystal molecules and a cell thickness are fixedly set and illuminating light is changed to red, green and blue, respectively.

In an experiment 3, setting was made such that the pre-tilt angle was $\theta p=82$ degrees and the cell thickness was d=3.5 μm, while the illuminating light is changed to R-color, G-color and B-color, respectively, (i.e., their central wavelengths are 620 nm, 550 nm and 450 nm, respectively). In each condition in which the wavelength of the illuminating light was changed, the twist angle $\phi$ was changed from 90 to 150 degrees for measurement of the black level (light leakage). Measured results are shown in FIG. 6, in which the twist angle $\phi$ shows a minimum at 120 degrees independently of changes in the wavelength of the illuminating light. Additionally it is understood that the black level (Light Leakage) is relatively lower in a range providing the twist angle $\phi$ of 110-130 degrees.

Experiment 4

Figure 7:
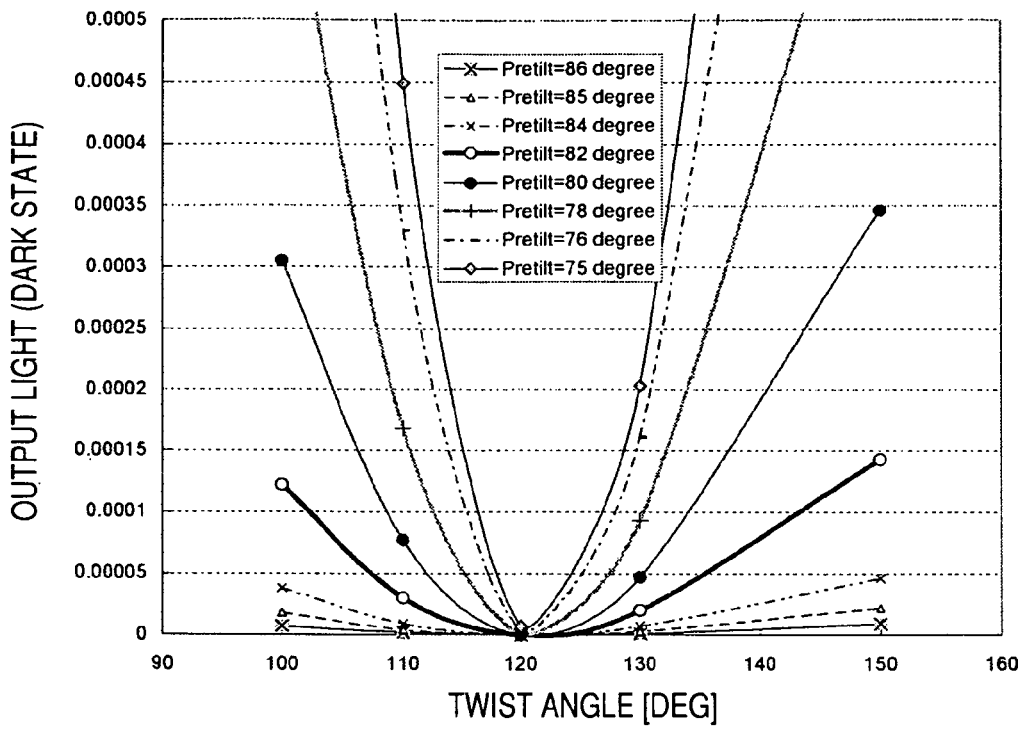
FIG. 7 is a graph showing the relationship between a twist angle and a black level in the reflective liquid crystal display device under the condition that the wavelength of illuminating light and a cell thickness are fixedly set and a pre-tilt angle is assigned to a parameter to be changed.
Figure 8:
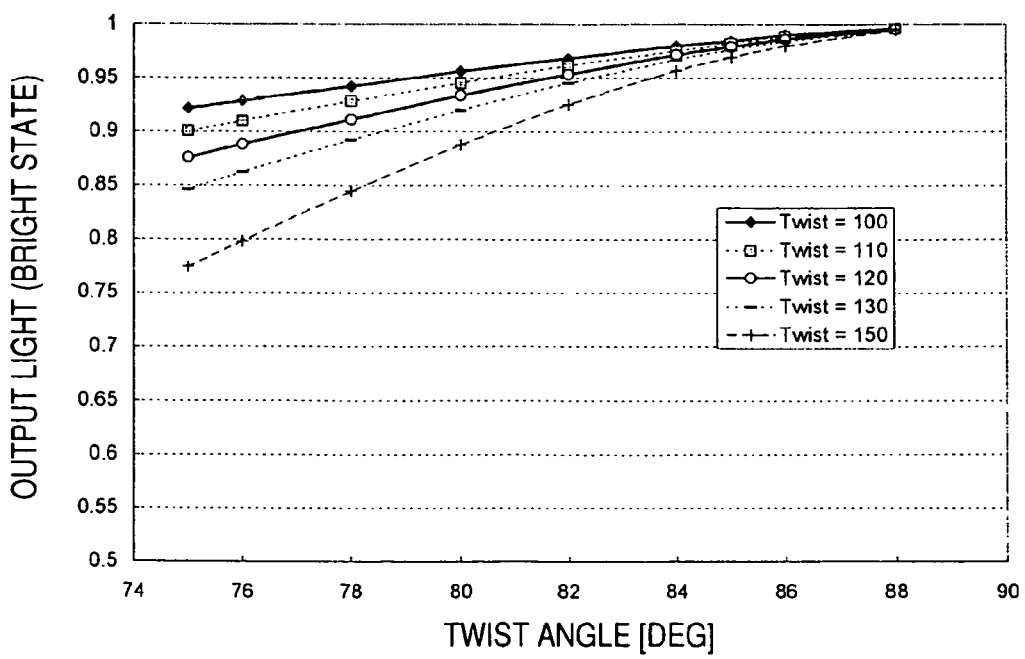
FIG. 8 is a graph showing the relationship between a pre-tilt angle and a white level in the reflective liquid crystal display device under the condition that the wavelength of illuminating light and a cell thickness are fixedly set and a twist angle is assigned to a parameter to be changed.
Figure 9:
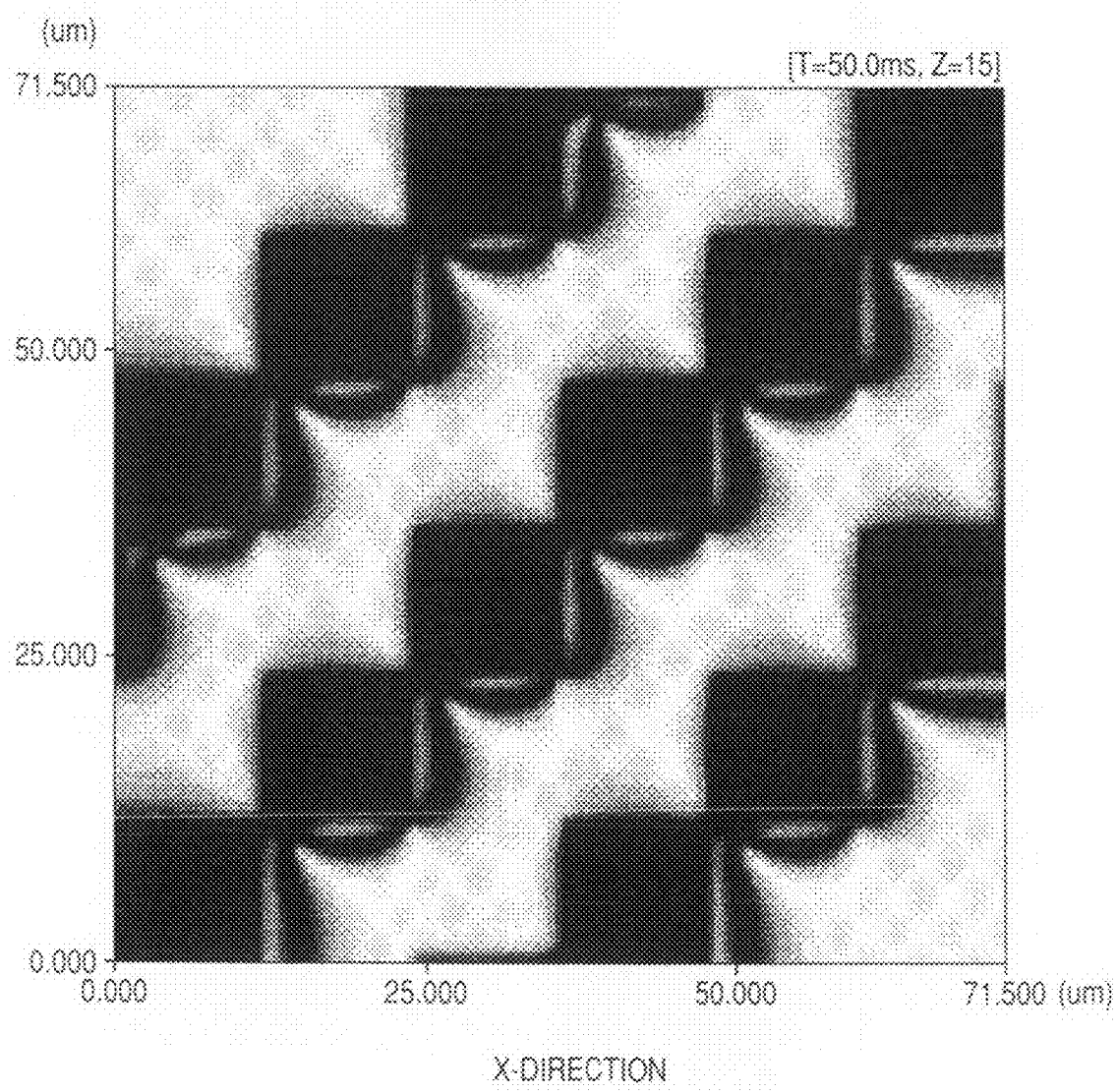
FIG. 9 is an enlarged picture showing a sate where a disclination is caused due to a voltage difference between mutually adjacent pixels on an active matrix substrate in the case of a pre-tilt angle of 86 degrees or more.

In an experiment 4, $\lambda=550$ nm (Green) and d=3.5 μm were set, while the pre-tilt angle $\theta p$ of the liquid crystal molecules was changed in a range of 75-86 degrees. And in each condition in which $\theta p$ is set to each angle, the twist angle $\phi$ was changed in a range of 100-150 degrees to measure the brightness of black at an applied voltage of 0 volts. This experiment showed that, as shown in FIG. 7, the brightness become to a minimum at a twist angle $\phi$ of 120 degrees and keeps relative lower levels in a range in which the twist angle $\phi$ is 110-130 degrees. From FIG. 8, it became clear that a maximum amount of output light to be obtained in response to each application of a voltage reduced even when the pre-tilt angle θp was lowered or the twist angle φ was raised.

As a result, in order to maintain a sufficient brightness level, it is necessary that the pre-tilt angle θp is set to 75 degrees or higher and the twist angle φ is set to 150 degrees or less.

Using the foregoing conditions for the pre-tilt angle θp and the twist angle φ, an image consisting of two pixels of white and one pixel of black which are aligned continuously in the horizontal scan direction was subjected to enlarged projected display for actual observation. Observed results are obtained as shown in Table 1.

TABLE 1

|   | 75 deg. | 76 deg. | 78 deg. | 80 deg. | 82 deg. | 84 deg. | 85 deg. | 86 deg. | 88 deg. |
|---|---|---|---|---|---|---|---|---|---|
| Twist = 100 deg. | ○ | ○ | — | ○ | ○ | ○ | ○ | ○ | x |
| Twist = 105 deg. | — | — | — | — | — | ○ | — | ○ | x |
| Twist = 110 deg. | ○ | ○ | ○ | ○ | ○ | ○ | ○ | Δ | x |
| Twist = 115 deg. | ○ | — | — | ○ | — | — | ○ | Δ | x |
| Twist = 120 deg. | ○ | ○ | ○ | ○ | ○ | ○ | ○ | Δ | x |
| Twist = 125 deg. | ○ | — | ○ | — | ○ | ○ | ○ | x | x |
| Twist = 130 deg. | ○ | ○ | ○ | ○ | ○ | ○ | ○ | x | x |
| Twist = 135 deg. | — | — | — | — | — | ○ | ○ | x | — |
| Twist = 140 deg. | ○ | — | — | — | — | ○ | ○ | x | x |
| Twist = 145 deg. | — | — | — | — | — | ○ | Δ | x | — |
| Twist = 150 deg. | ○ | ○ | ○ | ○ | ○ | ○ | Δ | x | X |

Notations:
○: Image quality is good
Δ: image quality is almost good
x: Image deterioration due to disclination is observed
—: No experiment (no data)

As shown in Table 1, it was confirmed that the image had a poor quality in a range of the pre-tilt angle θp which is 86 degrees or higher. This poor image quality is attributable to the fact that a difference in voltage between mutually adjacent pixels on the active matrix substrate 12 causes disclination. This disclination is illustrated in detail in FIG. 9, in which, at boundaries between each black pixel and each white pixel, areas which should originally be black suffer from the appearance of a while line and, contrary to it, pixels which should originally be white was partially blackened.

Further experiments 5 to 8 were conducted in the same way as the foregoing experiments 1 to 4 by using a liquid crystal layer composed of nematic liquid crystal having negative dielectric anisotropy and a double refraction index Δn of 0.132 and 0.155, respectively, obtained under a light wavelength of 550 nm (green).

Experiment 5

Under the condition that the wavelength λ of the illuminating light is 550 nm (Green), the pre-tilt angle θp of the liquid crystal molecules is 82 degrees, and the cell thickness d is 2 μm, the twist angle φ was designated as a parameter to be changed to 0, 30, 60, 90, 100, 110, 120, 130, and 150 degrees respectively. In each condition in which the twist angle φ was changed from one another, a voltage to be applied between the transparent substrate 11 and all the reflective electrodes on the active matrix substrate 12 was changed in a range of 0-5 Volts, during which time the amount of the reflected light (S-polarized) at the WG-PBS 2 was measured. Like the experiment 1, measured results are shown as an "applied voltage vs. output (light amount) characteristic" (in which the "output" is expressed with a logarithmic scale). As understood from the curves shown in FIG. 3, a twist angle φ of 120 degrees provided a maximum contrast. In the case of φ=110 degrees, a contrast ratio of $10^4$:1 or more were obtained, while in the case of φ=130 degrees, a contrast ratio which is slightly lower than $10^5$:1 was obtained at an applied voltage of 0 volt. In addition, at an applied voltage of 1 volt or thereabouts, the output (light amount) showed a local minimum, thus providing a contrast ratio of $10^6$:1 or more. In cases where, like the case of φ=130 degrees, the contrast ratio has a local minimum at a specific applied voltage, it is allowed to set the specific voltage as a voltage giving the black level.

Further, a further experiment based on the above experiment 5 was conducted in the same configuration as the above on a configuration in which the WG-PBS 2 was replaced by a MacNeille type of beam splitter. Like the first experiment 1, measured results were such that, at cone angles of the incident polarized light (P-polarized) of 10 degrees or higher, any twist angle φ exhibited contrast ratios which drastically reduced down to 200:1 or thereabouts. The reason for this drastic reduction in the contrast ratios is that the MacNeille type of beam splitter brings about a skew angle. In order to raise the contrast ratio, it was therefore necessary to place a quarter wave plate (i.e., phase compensator) correcting the A-component between the MacNeille type of beam splitter and the reflective liquid crystal display device.

Experiment 6

Figure 10:
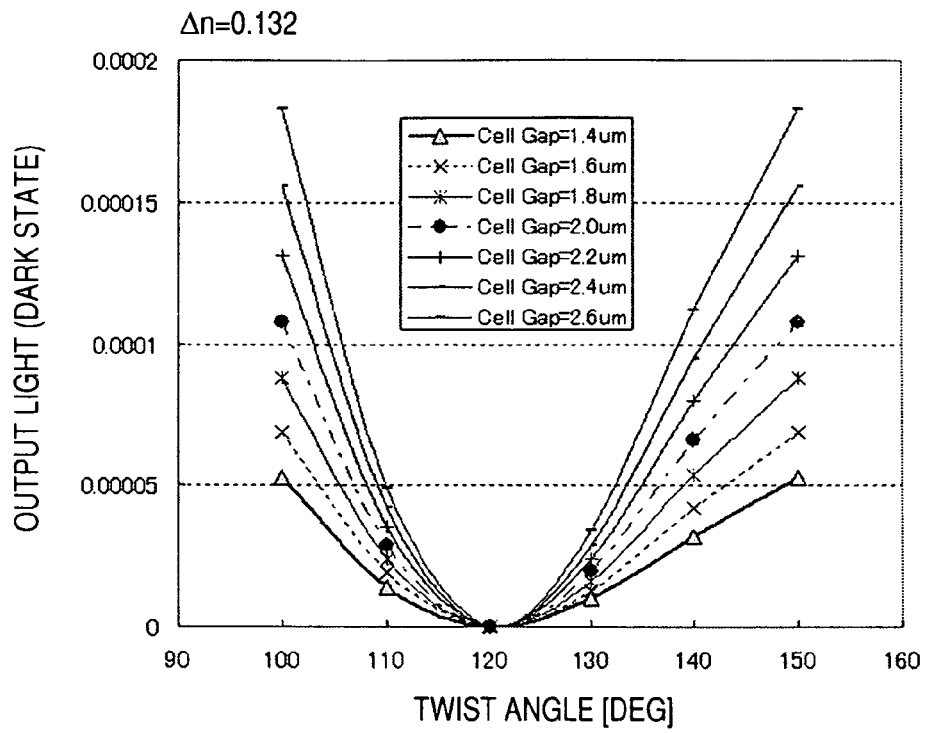
FIG. 10 is a graph showing the relationship between a twist angle and a contrast ratio of liquid crystal molecules of the reflective liquid crystal display device under the condition that the wavelength of illuminating light and the pre-tilt angle of the molecules are fixedly set, the double refraction index is set to 0.132, and the cell thickness is assigned to a parameter to be changed.
Figure 11:
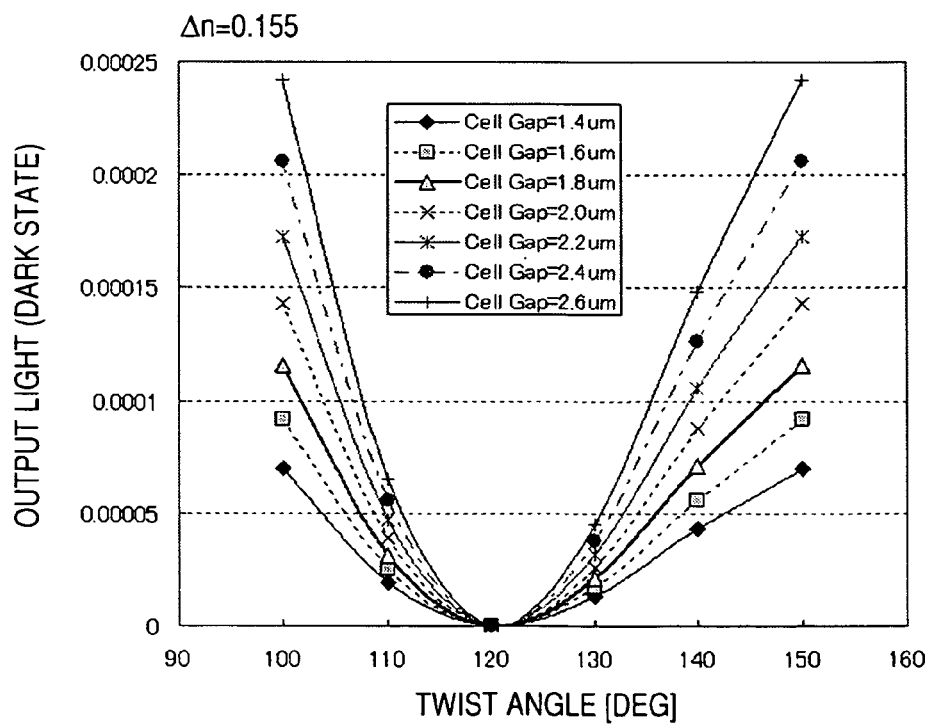
FIG. 11 is a graph showing the relationship between a twist angle and a contrast ratio of liquid crystal molecules of the reflective liquid crystal display device under the condition that the wavelength of illuminating light and the pre-tilt angle of the molecules are fixedly set, the double refraction index is set to 0.155, and the cell thickness is assigned to a parameter to be changed.

In an experiment 6, setting was made such that the wavelength was λ=550 nm (Green) and the pre-tilt angle was θp=82 degrees, while the cell thickness d was designated as a parameter to be changed every 0.2 μm in a range of 1.4-2.6 μm. In each condition in which the cell thickness d was changed, the twist angle φ was changed in a range of 100-150 degrees, during which time the brightness of black at an applied voltage of 0 volt and the brightness of white at an applied voltage of 5 volts were measured for a comparison between those brightness levels. Measured results are shown in FIGS. 10 and 11, which exhibits that the black level always become a minimum at φ=120 degrees regardless of changes in the cell thickness d and is relatively good in a range where the twist angle φ is 110-130 degrees.

Experiment 7

In an experiment 7, setting was made such that the pre-tilt angle was θp=82 degrees and the cell thickness was d=3.5 μm, while the illuminating light is changed to R-color, G-color and B-color, respectively, (i.e., their central wavelengths are 620 nm, 550 nm and 450 nm, respectively). In each condition in which the wavelength of the illuminating light was changed, the twist angle φ was changed from 90 to 150 degrees for measurement of the black level (light leakage). Measured results were similar to those in the experiment 3, in which the twist angle φ shows a minimum at 120 degrees independently of changes in the wavelength of the illuminating light. Additionally it is understood that the black level (Light Leakage) is relatively lower in a range providing the twist angle φ of 110-130 degrees.

Experiment 8

In an experiment 8, λ=550 nm (Green) and d=2 μm were set, while the pre-tilt angle θp of the liquid crystal molecules was changed in a range of 75-88 degrees. And in each condition in which θp is set to each angle, the twist angle φ was changed in a range of 100-150 degrees to measure the brightness of black at an applied voltage of 0 volt. This experiment showed that, like the experiment 4, the brightness become to a minimum at a twist angle φ of 120 degrees and keeps relative lower levels in a range in which the twist angle φ is 110-130 degrees. Similarly to the results in the experiment 4, it became clear that a maximum amount of output light to be obtained in response to each application of a voltage reduced even when the pre-tilt angle θp was lowered or the twist angle φ was raised.

As a result, in order to maintain a sufficient brightness level, it is necessary that the pre-tilt angle θp is set to 75 degrees or higher and the twist angle φ is set to 150 degrees or less.

In this experiment, the cell thickness d is set to 2 μm and 2.6 2 μm, respectively, while the pre-tilt angle θp of the liquid crystal molecules was changed during a range of 75 to 88 degrees and for each pre-tilt angle θp, the twist angle φ was changed during a range of 110 to 130 degrees. And an image was produced by alternately mapping two white pixels and one black pixel in each horizontal scanning direction, and this image was projected in an enlarged manner and subjected to an observation. By this observation, it was found that the image kept an almost good quality up to a pre-tilt angle θp of 87 degrees for a cell thickness of 2.6 μm and up to a pre-tilt angle θp of 88 degrees for a cell thickness of 2 μm, respectively. The reason is that, compared to the foregoing experiment 4, the cell thickness is made thinner to suppress each pixel from being influenced by the lateral electric fields from neighboring pixels. In contrast, in the experiment 4, it was found that the image was deteriorated due to the disclination in a range of pre-tilt angles θp of 86 degrees or more. However, by making the cell thickness thinner, such a difficulty can be overcome.

From the foregoing various experiments, the following conclusions can be derived. When the double refraction index Δn and the cell thickness d of the nematic liquid crystal layer having negative dielectric anisotropy are changed, the black level becomes a minimum at a twist angle φ of 120 degrees and is kept good over a range of twist angles φ of 110 to 130 degrees. In order to obtain a high quality image with higher contrast, it is preferred to set pre-tilt angles θp of 75 to 85 degrees. This is true of the case of the cell thickness d=3.5 μm. Setting the cell thickness d to 2.6 μm or less alleviates the influence of the disclination to a large extent, thus providing high-quality images. In addition, as shown in Tables 2 to 5, the pre-tilt angle θp that provides high-quality images can be extended to a range of 75 to 87 degrees as for a cell thickness of 2.6 μm and to a range of 75 to 88 degrees as for a cell thickness of 2 μm, respectively.

Accordingly, it can be concluded that the cell thickness d is available for a range of 3.5 μm or less, and preferably, it is desired to set the cell thickness d to 2.6 μm or less.

TABLE 2

| | (double refraction index Δn = 0.132, cell thickness d = 2 μm) | | | | | | | | |
|---|---|---|---|---|---|---|---|---|---|
| | 75 deg. | 76 deg. | 78 deg. | 80 deg. | 82 deg. | 84 deg. | 86 deg. | 87 deg. | 88 deg. |
| Twist = 110 deg. | ○ | — | — | ○ | — | — | ○ | ○ | Δ |
| Twist = 120 deg. | ○ | ○ | ○ | ○ | ○ | ○ | ○ | ○ | x |
| Twist = 130 deg. | ○ | — | — | ○ | — | — | ○ | Δ | — |

Notations:
○: Image quality is good
Δ: image quality is almost good
x : Image deterioration due to disclination is observed
—: No experiment (no data)

TABLE 3

(double refraction index Δn = 0.155, cell thickness d = 2 μm)

|  | 75 deg. | 76 deg. | 78 deg. | 80 deg. | 82 deg. | 84 deg. | 86 deg. | 87 deg. | 88 deg. |
|---|---|---|---|---|---|---|---|---|---|
| Twist = 110 deg. | o | — | — | o | — | — | o | o | Δ |
| Twist = 120 deg. | o | o | o | o | o | o | o | o | x |
| Twist = 130 deg. | o | — | — | o | — | — | o | Δ | — |

Notations:
o: Image quality is good
Δ: image quality is almost good
x: Image deterioration due to disclination is observed
—: No experiment (no data)

TABLE 4

(double refraction index Δn = 0.132, cell thickness d = 2.6 μm)

|  | 75 deg. | 76 deg. | 78 deg. | 80 deg. | 82 deg. | 84 deg. | 86 deg. | 87 deg. | 88 deg. |
|---|---|---|---|---|---|---|---|---|---|
| Twist = 110 deg. | o | — | — | o | — | — | o | Δ | x |
| Twist = 120 deg. | o | o | o | o | o | o | o | Δ | x |
| Twist = 130 deg. | o | — | — | o | — | — | o | Δ | — |

Notations:
o: Image quality is good
Δ: image quality is almost good
x: Image deterioration due to disclination is observed
—: No experiment (no data)

TABLE 5

(double refraction index Δn = 0.155, cell thickness d = 2.6 μm)

|  | 75 deg. | 76 deg. | 78 deg. | 80 deg. | 82 deg. | 84 deg. | 86 deg. | 87 deg. | 88 deg. |
|---|---|---|---|---|---|---|---|---|---|
| Twist = 110 deg. | o | — | — | o | — | — | o | Δ | x |
| Twist = 120 deg. | o | o | o | o | o | o | o | Δ | x |
| Twist = 130 deg. | o | — | — | o | — | — | o | Δ | — |

Notations:
o: Image quality is good
Δ: image quality is almost good
x: Image deterioration due to disclination is observed
—: No experiment (no data)

Figure 12A:
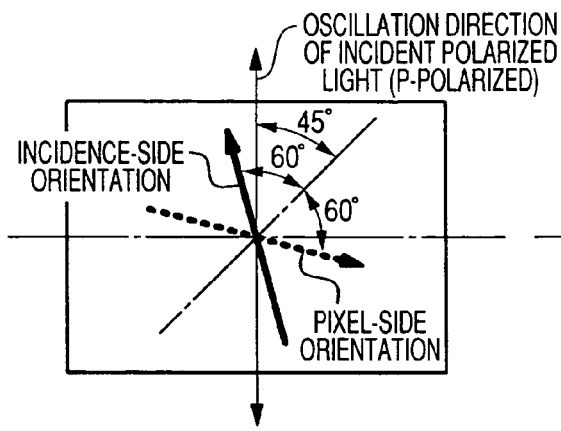
FIG. 12A is an ideal orientation condition for liquid crystal on the basis of experiments.
Figure 12B:
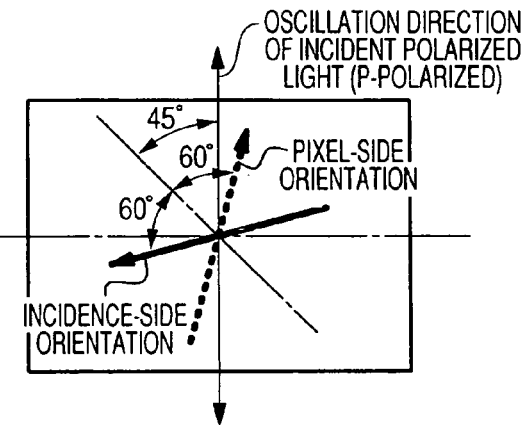
FIGS. 12B to 12D are orientation conditions equivalent to that shown in FIG. 12A.
Figure 12C:
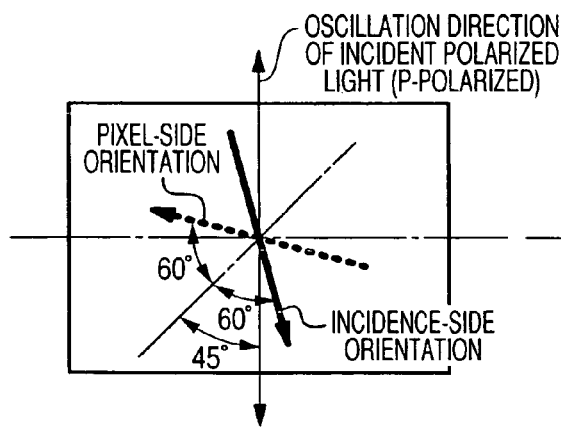
Figure 12D:
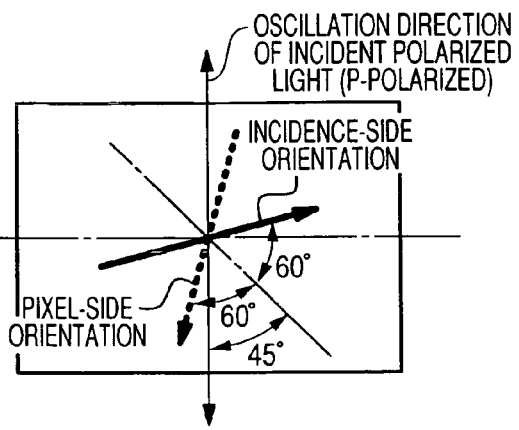
Figure 13A:
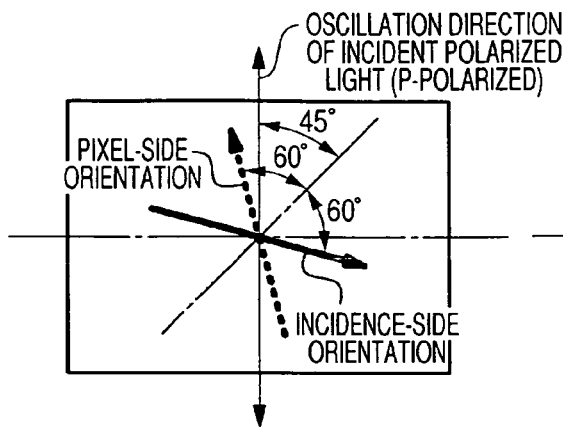
FIGS. 13A to 13D are orientation conditions for liquid crystal, which are equivalent to FIGS. 12A to 12D, respectively.
Figure 13B:
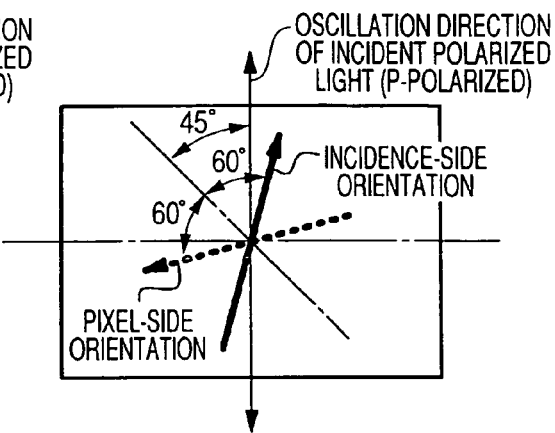
Figure 13C:
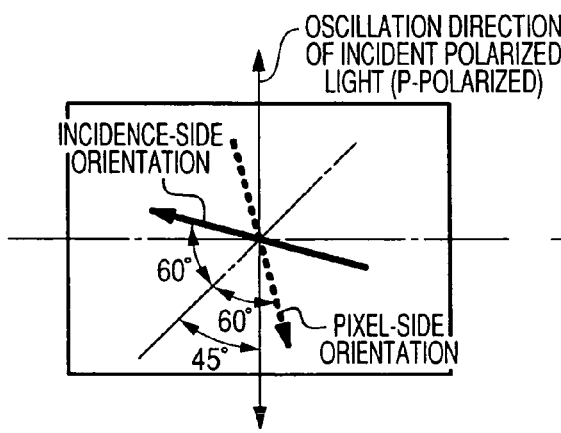
Figure 13D:
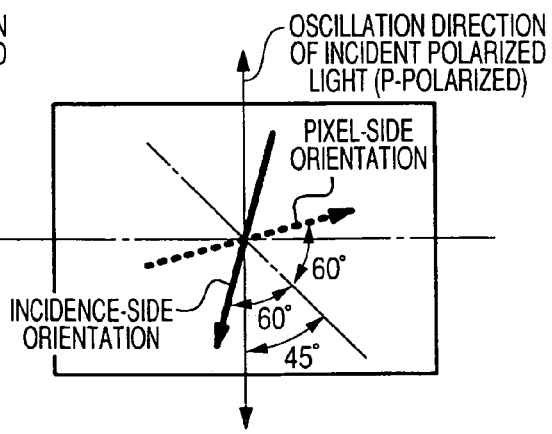

Although ideal orientation conditions derived from the foregoing embodiments can be illustrated in FIG. 12A, these are also optically equivalent to orientation conditions illustrated in FIGS. 12B, 12C and 12D, in which the reference line is rotated 90, 180, and 270 degrees, respectively. Moreover, from an optical point of view, the orientation conditions shown in FIG. 12A are also equivalent to those illustrated in each of FIGS. 13A-13D, in which the incidence-side and pixel-side liquid crystal orientation directions are opposite to each other from the directional geometry shown in FIGS. 12A-12D.

In the present embodiment, the twist angle φ is defined as an angle made between the pixel-side and incidence-side liquid-crystal orientation directions, as explained before, but this can still be modified as below. That is, the angle of the reference line (i.e., reference direction) from the oscillation direction of the incident polarized light (P-polarized light) is not always limited to an exact angle of 45 degrees, but may be set to an angular range of 45±5 degrees. As long as the twist angle φ is kept to 110-130 degrees, rotating the pixel-side and incidence-side liquid-crystal orientation directions within the range of the twist angle φ will have almost no influence on the contrast ratio, even though such a rotation may influence the brightness.

Further, the twist angle φ can be set to 110-130 degrees, and in such a case, the incidence-side and pixel-side liquid crystal orientation directions can be set respectively to a value in an angular range of 55-65 degrees to the reference line. An alternative way for setting the orientation directions is that, when it is assumed that variables α and β are zero or positive satisfying an inequality of |±α±β|≦10 (signs are inconsecutive), an angle made between the incidence-side liquid crystal orientation direction and the reference line is set to "60±α" degrees and a further angle made between the pixel-side liquid crystal orientation direction and the reference line is set to "60±β" degrees.

In addition, as to the variables α and β for setting an angle made with the reference line, it is particularly preferable that those variables α and β are set to meet a condition of |α|+|β|≦10.

In the first embodiment, the advantages can be summarized as follows.

When the reflective liquid crystal display device is arranged to receive, as incident light, the polarized light produced by the optical system including the wire grid, images can be displayed with high contrast which is critically significant. In using vertically aligned liquid crystal (nematic liquid crystal having negative dielectric anisotropy), it is necessary to give the liquid crystal molecules a pre-tilt angle θp so as to prevent the occurrence of disclination. In the case of the conventional reflective liquid crystal display device, the pre-tilt angle results in shifts in phases, thus lowering contrast to the contrary, thus requiring a phase compensator to compensate the phase shifts. However, thanks to the structures provided in the first embodiment, it becomes unnecessary to compensate A-components which differ depending on reflective liquid crystal display devices. In other words, with no use of a phase compensator for compensating the A-components, very high contrast can be given to images to be produced by each processor. Hence a further advantage is that, in the projection display apparatus obtaining color images through combining the modulated light on the three colors (R, G, B), differences among display characteristics on respective colors are improved, which leads to high and stabilized quality of images to be displayed by each display device.

Second Embodiment

Referring to FIGS. 14-19 and, according to need, the foregoing drawings, a second embodiment of the present invention will now be described. The second embodiment is concerned with how to limit the illuminating light.

Figure 4:
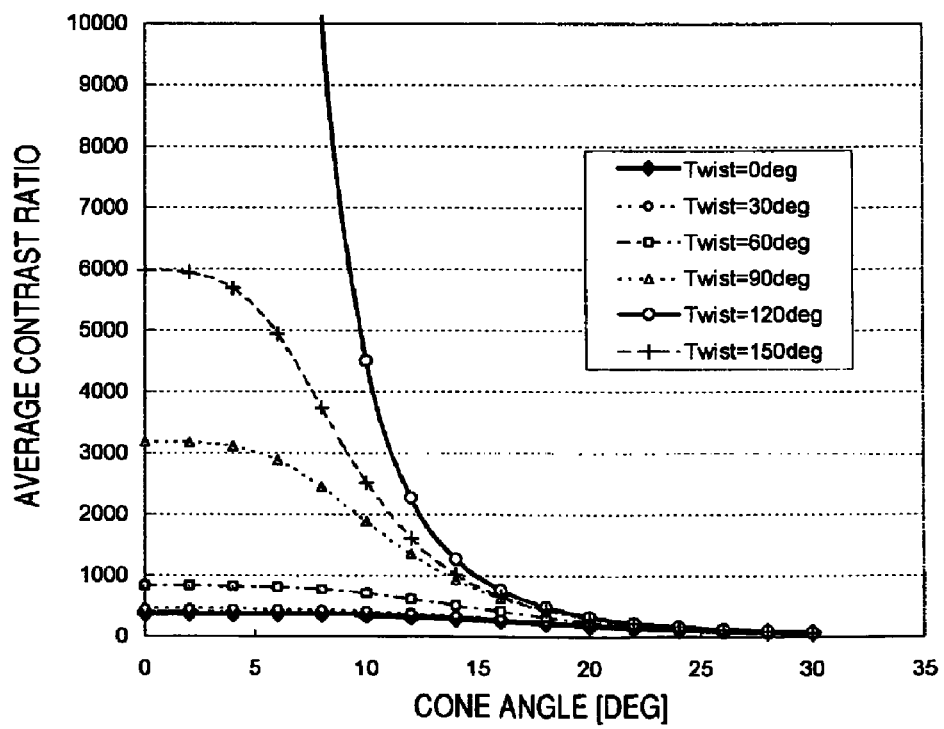
FIG. 4 is a graph showing the relationship between a cone angle of incident light and an average contrast ratio in the reflective liquid crystal display device under the condition that the wavelength of illuminating light, the pre-tilt angle of liquid crystal molecules, and a cell thickness are fixedly set and the pre-tilt angle of the liquid crystal molecules is assigned to a parameter to be changed.

In cases where, as shown in FIG. 4, the incident polarized light of which cone angle is 10 degrees or less is adopted, it was found that the contrast of images tended to be remarkably improved. It is therefore desirable to use incident polarized light with a cone angle of 9 degrees or less. This results in the use of an aperture member having an F-value of 3.6. When this aperture member was actually applied to the illuminating light, an improvement in contrast was found.

When the aperture is limited, the brightness will be lowered inevitably. This drawback can effectively be avoided by adopting an aperture shown in FIG. 14, in which the four corners of the incident illuminating light are limited inwardly along their diagonal line directions, respectively. It was confirmed by the present inventors that this limiting way keeps high contrast, with a decrease in the brightness kept to a small amount. Accordingly, in applying the reflective liquid crystal display device according to the first embodiment to the projection display apparatus equipped with the aperture member limiting the illuminating light, it is desired to adopt the aperture shown in FIG. 14.

Hereinafter, a projection display apparatus according to the present invention, which is still equipped with the foregoing aperture member, will now be exemplified. For the sake of an easier understanding, the whole configuration of this projection display apparatus will now be outlined, prior to the description of the aperture member inherent to the embodiment.

Figure 15:
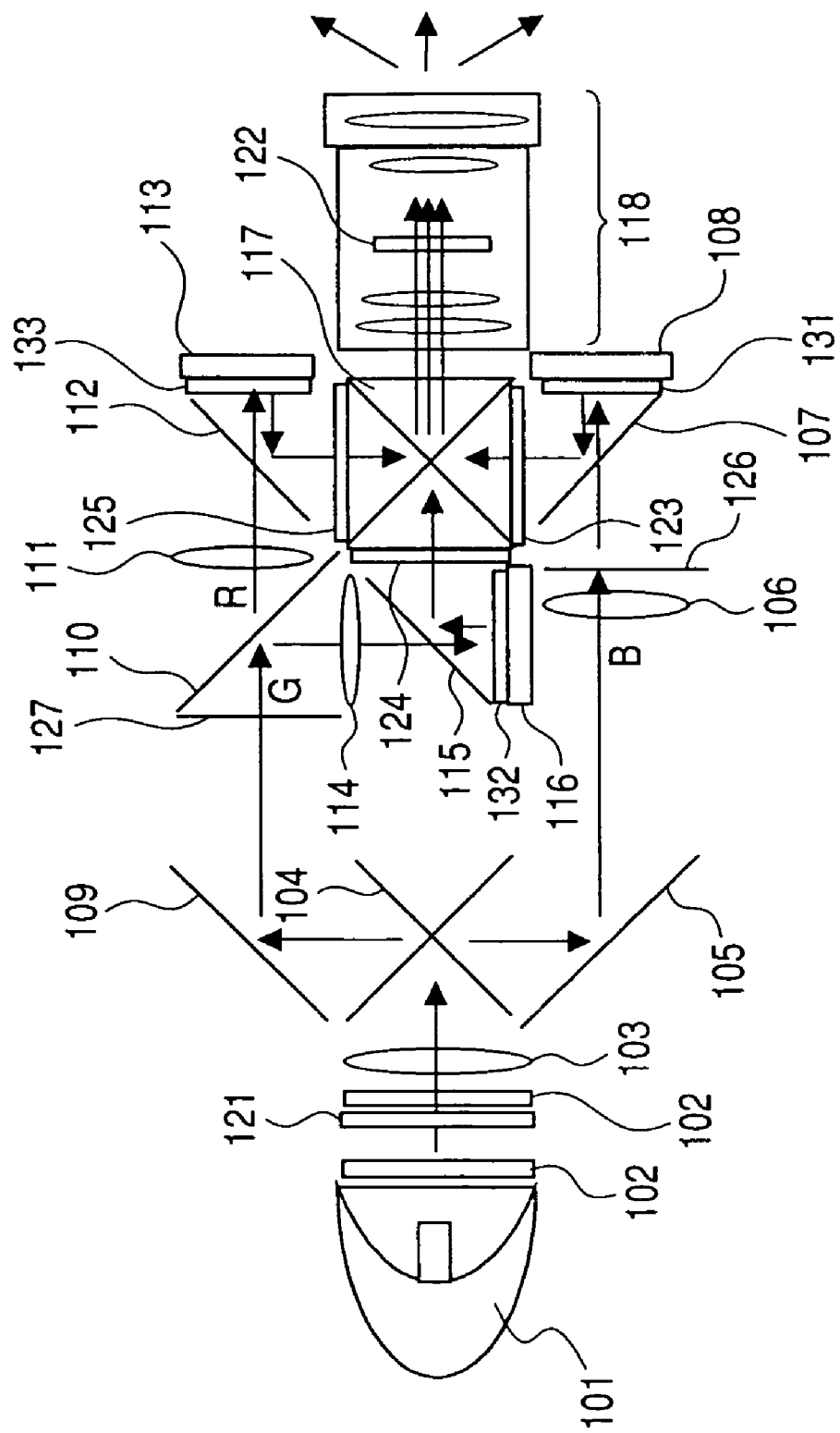
FIG. 15 is a diagram outlining the optical configuration of a projection display apparatus according to the second embodiment.
Figure 16:
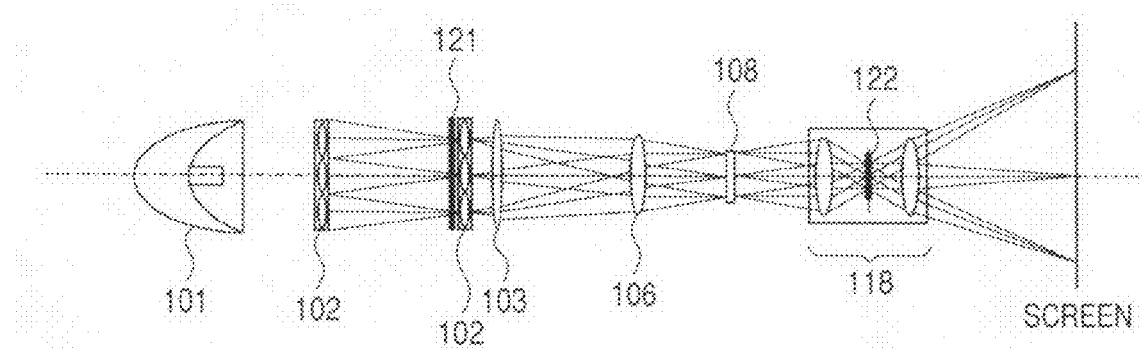
FIG. 16 is a pictorial illustration showing a simplified optical system for a single-color channel of the projection display apparatus shown in FIG. 15.
Figure 17:
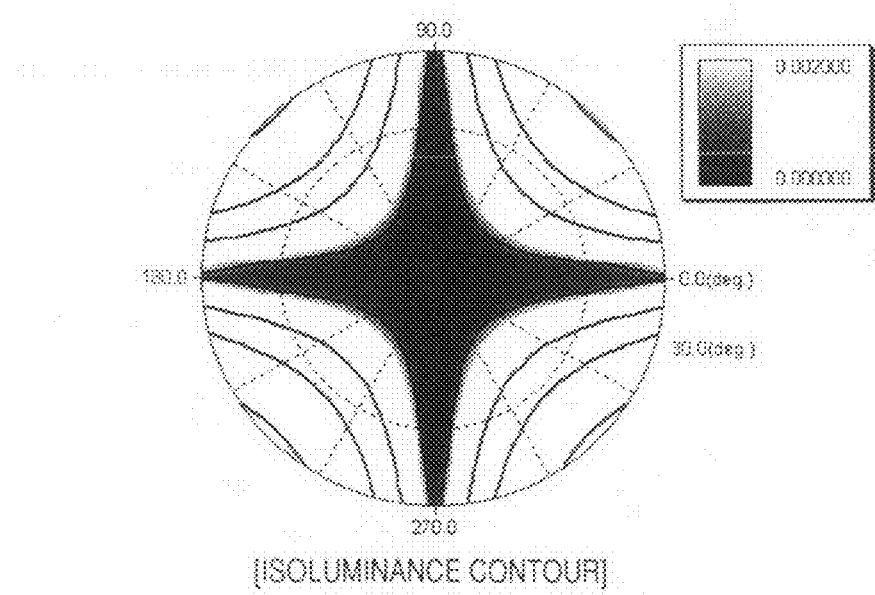
FIG. 17 is an illustration for a viewing angle characteristic.

FIG. 15 is a plan view showing the configuration of this projection display apparatus, while FIG. 16 illustrates an optical path from a light source to a screen, which is adopted by the projection display apparatus shown in FIG. 15. In the configuration shown in FIG. 16, a color-separating optical system, a polarizing optical system such as a wire grid type of polarizing beam splitter, a color-synthesizing optical system, and an optical system for controlling optical paths are omitted from being depicted.

As shown in FIG. 15, the projection display apparatus adopts a fry's eye integrator which serves as the illuminating optical system. That is, in this projection display apparatus, illuminating light generated by a light source 101 passes an aperture member 121 and a fry's eye integrator 102, both of which composes the illuminating optical system, passes a condenser lens 103, and then enters a cross dichroic mirror 104 serving as a first color-separating optical system.

The fry's eye integrator 102 has a pair of flat transparent base plates on each of which small-diameter convex lenses are arrayed in a matrix form. This fry's eye integrator 102 is able to produce a large number of optical source images, so that superposing those optical source images on one another gives uniformity to the distribution of illuminations of this illuminating light.

The cross dichroic mirror 104 has a structure of two dichroic mirrors which is combined with each other in a cross form, in which one mirror is able to reflect blue light B and the other mirror is able to reflect red-green light RG. Thus, this mirror 104 receives the illuminating light from the light source 101, and reflects the blue light component B in a first direction and the red-green light component RG in a second direction opposite to that along which the blue light component B is reflected.

The blue light component B, which has been reflected by the mirror 104 in the first direction, is then reflected by a first mirror 105 to change its directions so that the light passes a field lens 106. The light from the field lens 106 then enters a first wire grid type of polarizing beam splitter 107. This splitter 107 is obliquely positioned to have an attitude of approximately 45 degrees to the optical path, which has the capability of permitting only a P-polarized light component to be passed therethrough. That is, prior to the incidence to the first wire grid type of polarizing beam splitter 107, the light is converted to the P-polarized light by a pre-polarizer 126, whereby images being displayed are improved in terms of their contrast. The blue light component B, which has passed this splitter 107, then enters to a first reflective liquid crystal display device 108 placed for this blue light component B. For example, this display device 108 is structured into a reflective liquid crystal light bulb.

Meanwhile the red-green light component RG reflected in the second direction by the cross dichroic mirror 104 changes its directions by the reflection at a second mirror 109, and then enters, through a pre-polarizer 127, a dichroic mirror 109 serving as a second color-separating optical system. Hence, before entering the dichroic mirror 110, the reflected light is converted into P-polarized light in advance. This manner is also effective in improving the contrast, like the foregoing. In this way, the dichroic mirror 110 allows the red light component R to be passed therethrough and the green light component G to be reflected thereat, thus causing the red and green light components R and G to be separated from each other.

In addition, the red light component R that has passed the dichroic mirror 110 enters a second wire grid type of polarizing beam splitter 112 via a field lens 111. This beam splitter 112 is located to have a tilt of approximately 45 degrees to the optical path, so that the beam splitter 112 allows only the P-polarized light component to pass therethrough. The red light component R, which have passed the beam splitter 112, enters a second reflective liquid crystal display device 113 paced for the red light component R.

The green light component G, which has been reflected by the dichroic mirror 110, enters a third wire grid type of polarizing beam splitter 115 via a field lens 114. This beam splitter 115 is also located to have a tilt of approximately 45 degrees to the optical system, so that only the P-polarized light component to the beam splitter 115 is allowed to pass the beam splitter 115. Before entering the beam splitter 115, the light is converted into the P-polarized light by the pre-polarizer 127 in advance, whereby images being displayed is improved from a contrast viewpoint. The green light component G, which has this third wire grid type of polarizing beam splitter 115, is then made to enter a third reflective liquid crystal display device 116 placed for the green light G.

The blue, red and green light components B, R and G, which have now entered the reflective liquid crystal display devices (reflective spatial light modulating elements) 108, 113 and 115, respectively, are reflected to include image light modulated to S-polarized light depending on image signals, so that the modulated light beams return to the beam splitters (reflective polarizing plates) 107, 112 and 115, respectively. As shown in FIG. 15, the image light beams are reflected by the beam splitters 107, 112 and 115, respectively, so as to advance through three optical paths toward a cross dichroic prism 117 serving as the color-synthesizing optical system.

As a preferred mode according to the present embodiment, between each of the beam splitters 107, 112 and 115 and the cross dichroic prism 117, an analyzer 123 (124 and 125) for each color light beam is inserted for removing unnecessary polarized components from each of the image light beams reflected by the beam splitters 107, 112 and 115, respectively. The use of the analyzers improves the contrast of images being displayed. This analyzer is formed by a polarizing plate, and may be formed by a wire grid type of polarizing plate.

The cross dichroic prism 117 is structured into a cubic prism formed by combining and bonding four triangle-pole-like prisms together. On the bonding surface of each triangle-pole-like prism, there is formed a dichroic membrane, which is formed so that membranes on the two surfaces are mutually crossed at the center of the cross dichroic prism 117. In this prism 117, the dichroic membrane which serves one-side surface is able to reflect the blue light component B but allow the red and green light components R and G to pass therethrough. In addition, in this prism 117, the dichroic membrane which serves the other-side surface has the capability of reflecting the red light component R but allowing the blue and green light components B and G pass therethrough.

Accordingly, the cross dichroic prism operates such that the blue light component B entered from the one-side surface is reflected by the dichroic membrane serving as the one surface so as to transmit the reflected light ahead of the prism 117, the red light component R entered from the others-side surface is reflected by the dichroic membrane serving as the other surface so as to transmit the reflected light ahead of the prism 117, and the green light component G entered from the back surface is transmitted ahead of the prism 117 via the respective dichroic membranes. Hence the blue, red and green light components B, R and G are synthesized with each other.

The resultant blue, red and green light components B, R and G synthesized by the cross dichroic prism 117 are made to enter a projection lens 118 as a synthesized light beam (see FIGS. 15 and 16). The projection lens 118 operates to project the incident image light beams on a screen for displaying images.

In the optical path in the projection lens 118, a further aperture member 122 is disposed, in addition to the foregoing aperture membrane 121 disposed in the illuminating light path. Each of the aperture members 121 and 122 includes a combination of a plurality of blades, gears and a motor, like a shutter for cameras, for instance.

The configuration shown in FIGS. 15 and 16 is provided with both aperture members 121 and 122 at the same time, but this is not a definitive list. Either the aperture member 121 or the aperture member 122 can be disposed in a selective manner.

As shown in FIG. 4, using the incident polarized light whose cone angle is 10 degrees or less considerably raises contrast of images. In particular, it is thus preferred to use the incident polarized light whose cone angle is 9 degrees or less. Such a use corresponds to use of an aperture member having an F-value of 3.6. When such an aperture member is actually applied to the illuminating light, the contrast of images is obtained. It is therefore possible to additionally arrange the foregoing aperture member(s) in the present projection display apparatus in the illuminating optical system and/or the projecting optical system, whereby images being projected can be improved considerably.

Figure 14:
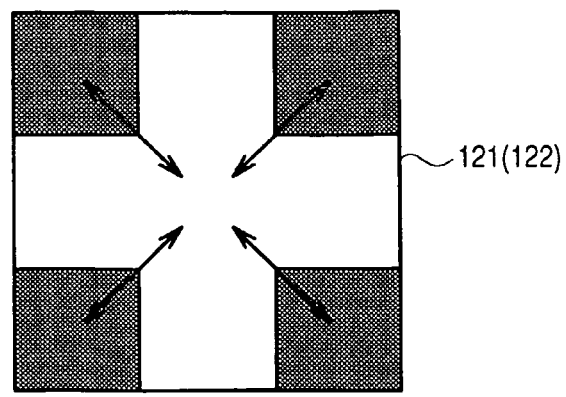
FIG. 14 illustrates how to collimate an aperture for light in a reflective liquid crystal display device according to a second embodiment of the present invention.

However, when the aperture member is used, it is inevitable to decrease the brightness of images. As to this problem, it is effective to adopt the limiting way to limit pixels along the diagonal directions of an aperture, from the four corners gradually, as shown in FIG. 14. This limiting way is helpful for giving an increased contrast to images being displayed, with the brightness of the images suppressed from lowering so much.

The pre-tilt angle and the twist angle can be set as described before, so that the viewing angle characteristic of the reflective liquid crystal display device can be widened. This viewing angle characteristic is exemplified as an isoluminance contour in FIG. 17, which shows that this aperture member gives contrast to light having angular components in the diagonal directions of the aperture.

In the case of the aperture member 121 (122) shown in FIGS. 15 and 16, a light intensity distribution over the angles of the illuminating light can be grasped as a light intensity distribution of light source images produced on the secondly positioned fly's eye integrator 102 observed when being viewed from the side of the light source 101. The aperture member 121 (122) has a rectangular aperture accepting the illuminating light and is disposed in the vicinity of the fly's eye integrator 102.

Figure 18:
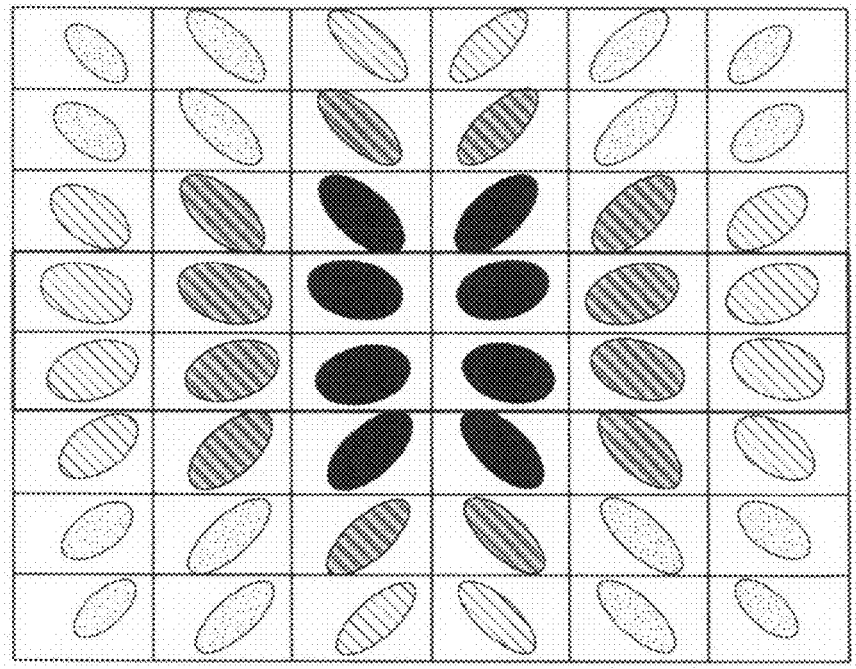
FIG. 18 is an illustration of light source images on a fly's eye integrator, the illustration corresponding to the aperture of a conventional aperture member.

In a light intensity distribution of light source images in the aperture of the aperture member 121, the intensity becomes weaker as the position in the aperture approaches to the four corners in the diagonal directions, when viewed along the frontal direction of the secondly positioned fry's eye integrator 102. FIG. 18 pictorially illustrates such a condition corresponding to a conventional aperture member, where setting is made such that the denser (darker) the light source image positions in an aperture, the higher the light intensities. As can be understood from this illustration, the four corners of the aperture, which provide components at larger angles, are given lower light intensities. Even if the four corner portions are lower in the light intensities, such portions contain lots of components which decrease the contrast.

Figure 19:
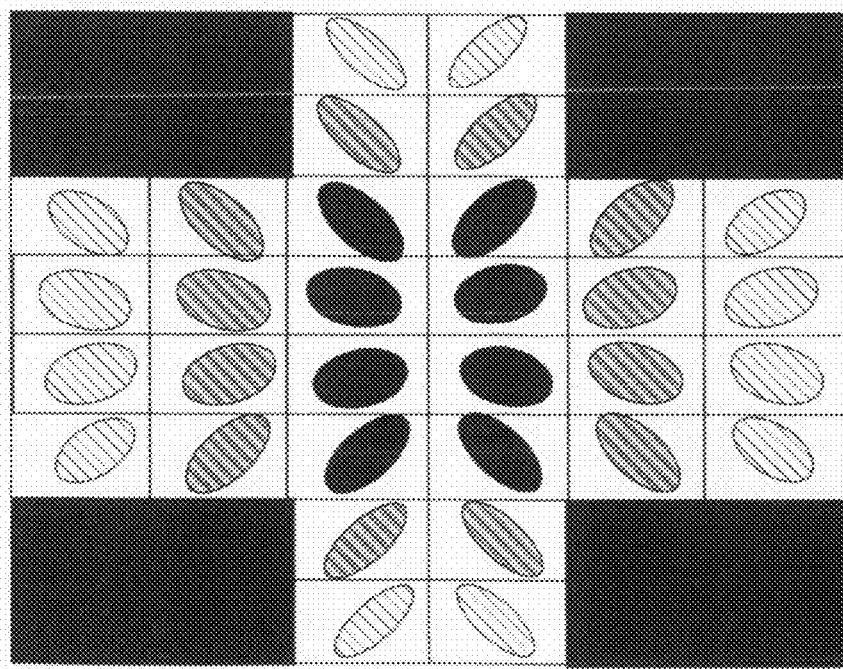
FIG. 19 is an illustration showing the limiting characteristic of an aperture member based on a light source image on a fly's eye integrator used by the projection display apparatus according to the second embodiment.

In contrast, the aperture member 121 (122) according to the present embodiment has the aperture that is able to provide a light intensity distribution of light source images, which is shown in FIG. 19. Specifically, in the four corner regions of a rectangular aperture, there are formed light-shielding membranes (refer to four black rectangular regions), so that light rays are removed preferentially compared to the remaining region. Hence it is possible to enhance the contrast of images, with no large decrease in the brightness of the illuminating light.

In this embodiment, the aperture member 121 is arranged in the illumining optical system, whereby unnecessary light rays can be prevented from being transmitted after the color-separating optical system. This is effective in suppressing increases in temperature of the liquid crystal display devices and optical parts as much as possible.

Additionally, the fly's eye integrator in the illuminating optical system can be replaced by a light pipe type of integrator. In this case, it is preferred to dispose the integrator in the vicinity of the optical source images, providing the advantage similar to the above.

The disposal position of the aperture member is not always limited to that in the illuminating optical system, but may be assigned to a position in the projection optical system. Since there are formed the secondary light source images also in the projection lens 118, the aperture member 122 in FIGS. 15 and 16 is disposed at a specific position or at neighboring positions thereto in the projection lens 118, the secondary light source images being formed at the specific position. This aperture member 122 also has the similar advantages to those resultant from the aperture member 121. Further, the secondary light source images produced in the projection lens are smaller, providing another advantage that the aperture member can be made smaller and less cost.

As a result, in cases where the reflective liquid crystal display device according to the first embodiment is applied to a projection display apparatus, the aperture member(s) adopted by the second embodiment enables an increase in the contrast of images being displayed, with the brightness suppressed from decreasing so largely.

Figure 20:
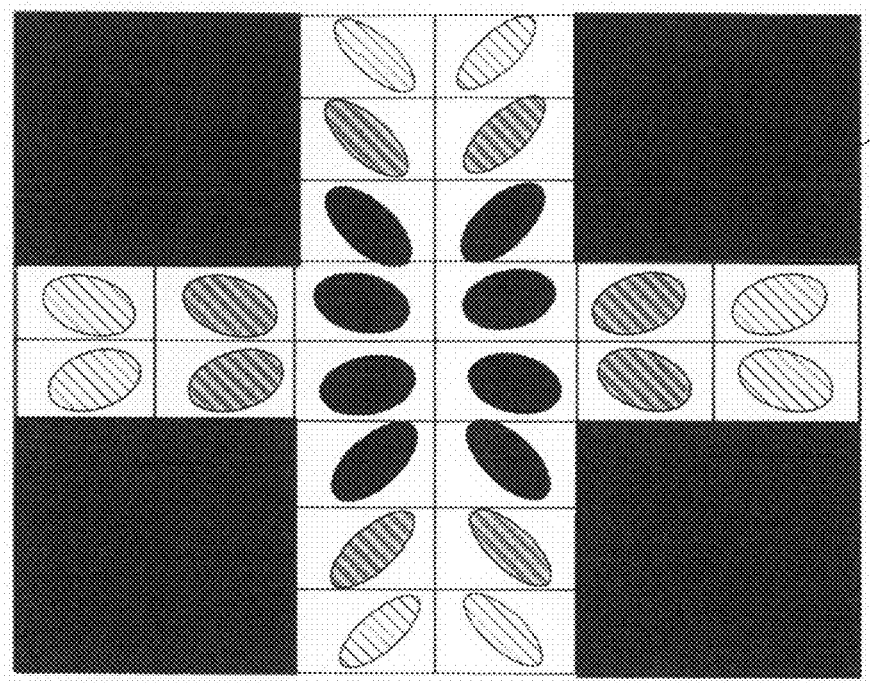
FIG. 20 is an illustration showing the limiting characteristic of another aperture member based on the light source image on the fly's eye integrator.
Figure 21:
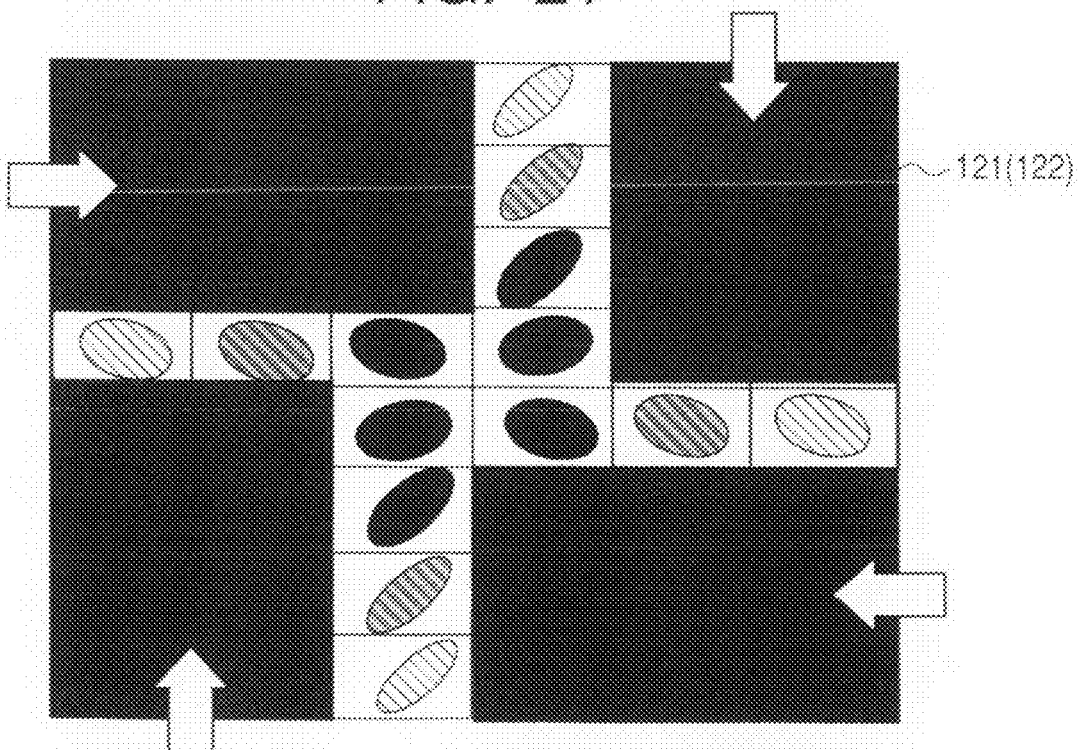
FIG. 21 is an illustration showing the limiting characteristic of another aperture member based on the light source image on the fly's eye integrator.
Figure 22:
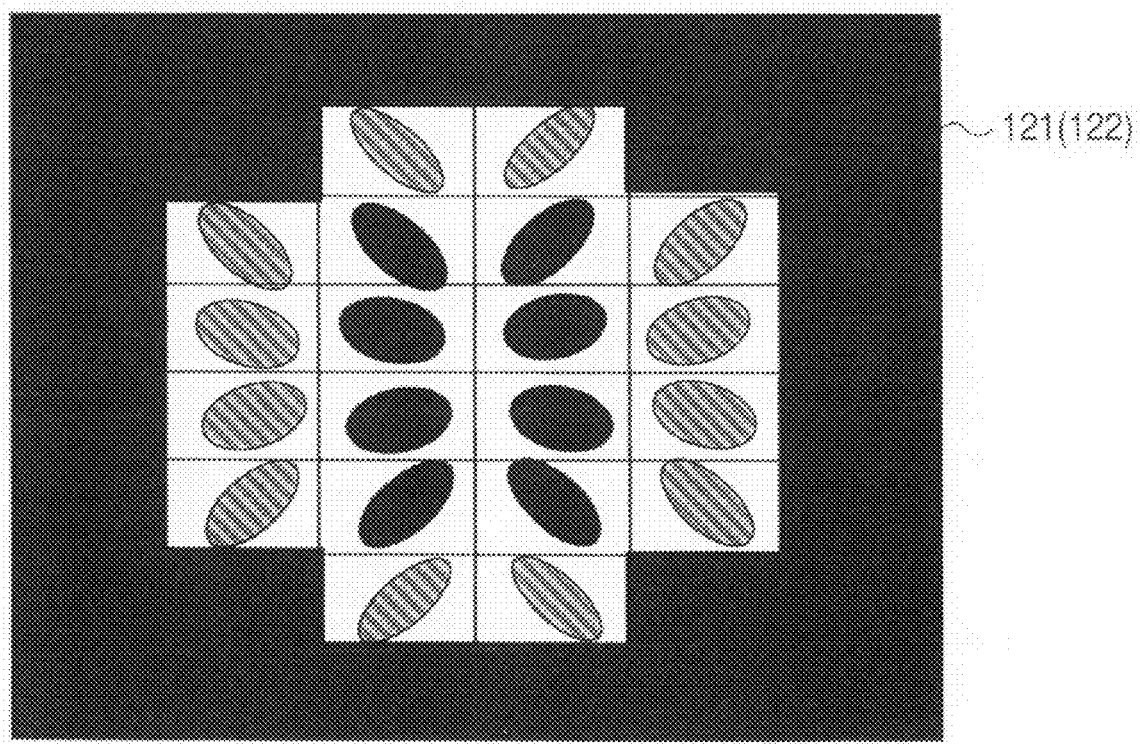
FIG. 22 is an illustration showing the limiting characteristic of another aperture member based on the light source image on the fly's eye integrator.
Figure 23:
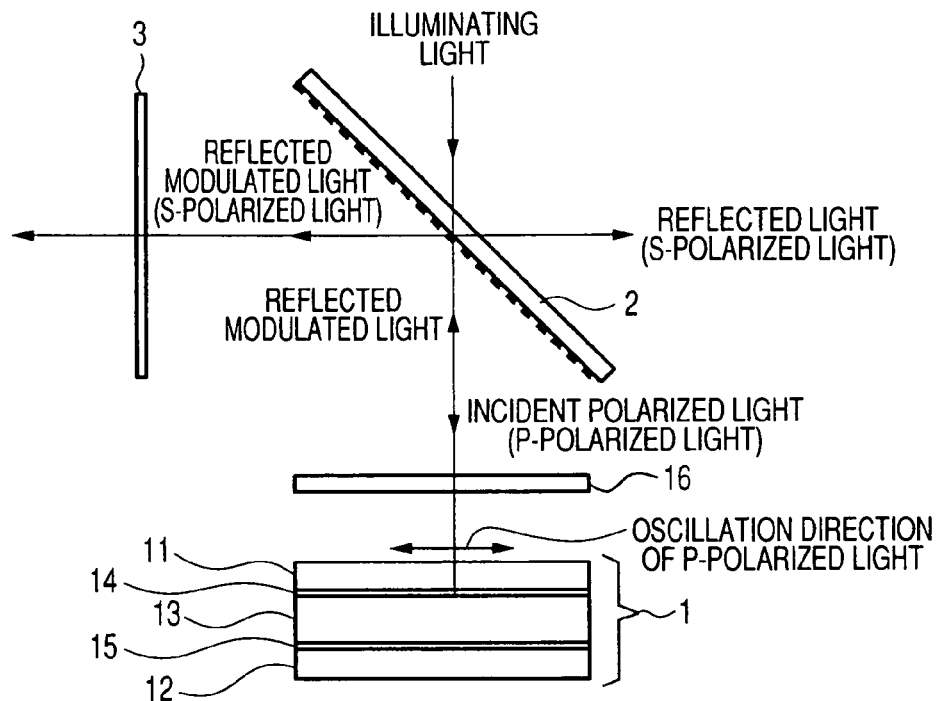
FIG. 23 is a schematic diagram showing an optical system composing a processor for a single color, the optical system being incorporated in a projection display apparatus and employing a reflective liquid crystal display device according to a third embodiment of the present invention.
Figure 24:
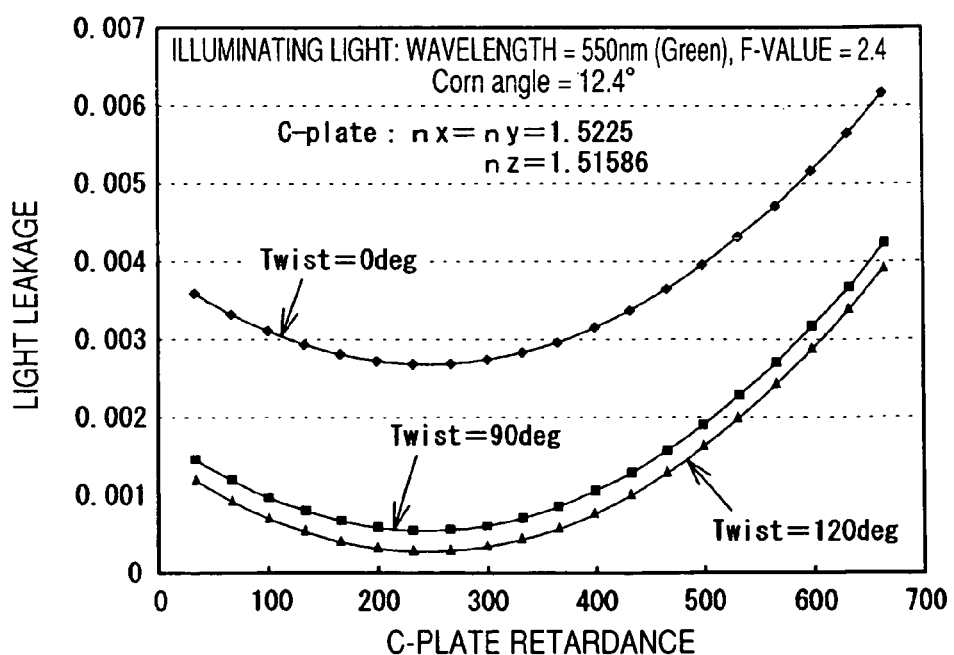
FIG. 24 is a graph showing the relationship between a phase difference of a phase compensator and an amount of light to be leaked in the black state in the projection display apparatus according to the third embodiment, in which the pre-tilt angle of molecules of the liquid crystal layer and the cell thickness thereof are fixedly set and the twist angle of the liquid crystal layer is assigned to a parameter to be changed.

The aperture members 121 and 122 used in the second embodiment can be modified into further structures. Though the pattern of such an aperture member can be fixed, but may be movable by for example limiting it into smaller ones, as shown in FIG. 20. The brightness and/or contrast of images can be adjusted dynamically. For example, the adjustment can be done as exemplified in FIG. 21, where the aperture is narrowed to drop the brightness for an improvement in the contrast. FIG. 22 also shows another modification of such adjustment manners.

Third Embodiment

Referring to FIGS. 15, 23-29, a projection display apparatus according to a third embodiment of the present invention will now be is described, in which the reflective liquid crystal display device according the present invention is employed. In particular, the third embodiment is concerned with the projection display apparatus which adopts a phase compensator for incident light entering the display device.

In the reflective liquid crystal display device 1 shown in FIG. 1, it is ideal that the incident angle of the incident polarized light to the liquid crystal layer 13 is 0 degree. Meanwhile, in general, an illuminating apparatus radiating illuminating light toward the reflective liquid crystal display device 1 adopts an integrator optical system in order to raise the efficiency of use of light. This adoption of the integrator optical system will result in giving a cone angle to the incident polarized light. If this cone angle becomes larger, the liquid crystal layer 13 is obliged to give a larger difference in phase to the light due to double refraction thereat, whereby images to be displayed are subjected to deterioration in the contrast.

In the present embodiment, this problem is overcome by adopting a phase compensator serving as a phase compensator. To be specific, as illustrated in FIG. 14, a projection display apparatus is provided with a phase compensator 16 placed between the WD-PBS 2 and the reflective liquid crystal display device 1, with the result that high contrast of images is obtained. This was confirmed by the present inventors through experiments. In FIG. 14, the remaining components other than the plate 16 are the same as those described in the first embodiment.

For example, on the condition that the pre-tilt angle and the cell thickness of the molecules of the liquid crystal layer 13 both are fixedly set and illuminating light is set to have a wavelength of 550 nm (Green), an F-value of 2.4, a cone angle (polar angle) of 12.4 degrees, the twist angle of the molecules of the liquid crystal layer 13 is selectively set to 0, 90 and 120 degrees. For each of such twist angles, the phase compensator 16 is subjected to changes of its phase difference for measurement of light leakage in the black state. Measured results are shown in FIG. 15, in which it was confirmed that a phase difference of approximately 250 nm provides a black level of the least leakage of the light, providing high contrast. In addition, confirmation was also made which a range from 130-400 nm in the phase difference still provides good black level states.

It should be noted however that the phase compensator 16 used in the above inventors' experiments was selected to have a thickness-directional refraction index nz smaller than plate-directional refraction indexes nx=ny. A practical example is nx=ny=1.5225 and nz=1.51586. The reason why the above phase compensator 16 is selected is as follows. The phase difference needed by this plate for the necessary becomes larger with an increase in the incident angle of the incident polarized light. However, even if the same phase difference $\Delta P=2\pi \cdot (nx-nz)(d/\gamma) \cdot$ (wherein d is a layer thickness and $\gamma$ is the wavelength of incident polarized light) is given, an averagely larger in-plane refraction index (nx+ny)/2 gives a smaller refraction angle to the light passing the phase compensator 16 based on Snell's law. This results in deteriorating effectiveness for the phase compensation. Therefore, the thickness-directional refractive index nz of the plate 16 was made smaller than that of the plate-directional ones nx and ny.

Figure 25:
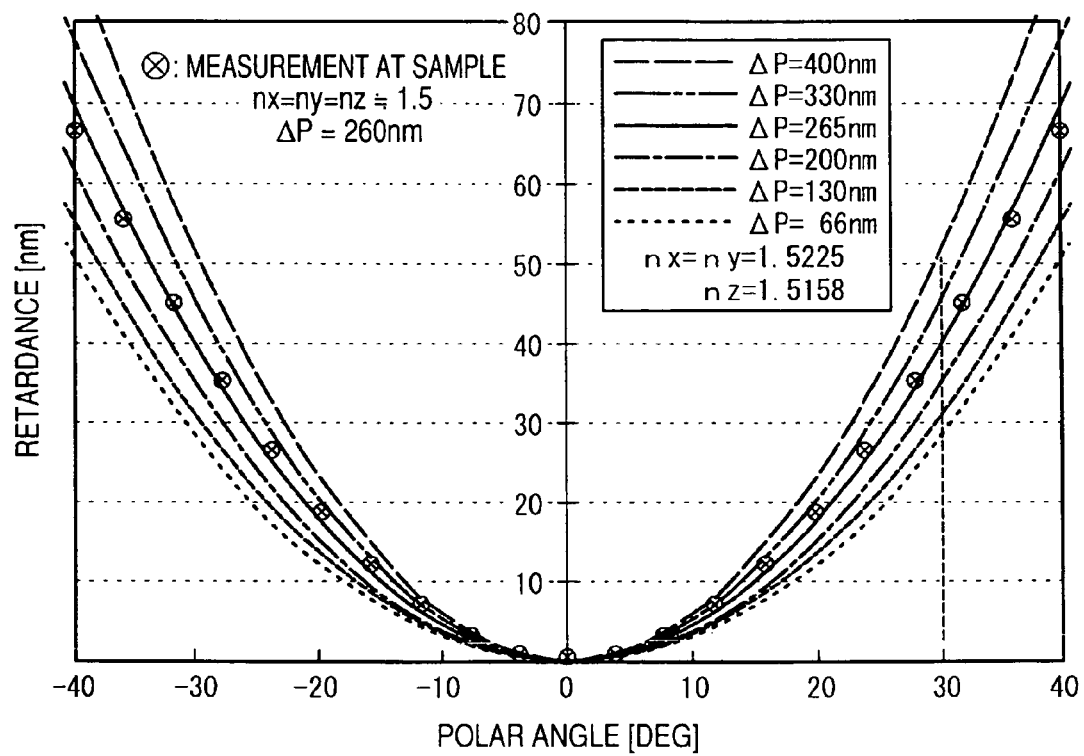
FIG. 25 is a graph showing measurements according to samples of a phase compensator and simulation results, wherein an axis of abscissae is assigned to incident angles of polarized light entering the phase compensator while an axis of ordinate is assigned to differences from a phase difference obtained in an incident angle of 0 degree, wherein refraction indices are set to nx=ny=1.5225 and nz=1.51586, and the phase difference is assigned to a parameter to be changed.

By the way, in FIG. 25, there are shown graphs providing, along an axis of abscissae, incident angles of the incident polarized light entering the phase compensator 16 and, along an axis of ordinate, differences from a phase difference in the case of an incident angle of 0 degree. The incident angle is measured as an angle of the incident polarized light to the substrate surface.

The graphs provide two types of values of retardance (nm) of the light. One type of values are measurement values of the retardance obtained under the samples (a refractive index is some 1.5 and a phase difference is 260 nm) of a phase compensator experimentally showing high contrast, while the other type of values are simulated values of the retardance which are obtained with the use of hypothetical phase compensators whose refractive indices are nx=ny=1.5225 and nz=1.51586 and phase differences are changed to 66, 130, 200, 265, 330 and 400, respectively.

As clearly comprehensive from FIG. 25, the measured values precisely agree with the simulated values. In a condition where the phase difference at the phase compensator 16 is in a range of 130-400 nm, which was been confirmed as an optimum range in FIG. 24, it can be inferred that the difference from the phase differences according to the incident polarized light having a cone angle (polar angle) of 30 degrees corresponds to a range of 31-52 nm. From this fact, it is understood that, when the incident angle of the incident polarized light to the substrate surface is 30 degrees, the phase compensator 16 can be given an optical characteristic that changes by 31-52 nm from a phase difference to be caused in response to an incident angle of 0 degree. Utilizing the phase compensator 16 having such an optical characteristic provides images with high contrast.

Utilizing FIG. 15 again, the forgoing phase compensator will now be detailed in terms of its actual application.

The reflective liquid crystal display device shown in FIG. 15 exemplifies a structure in which the foregoing phase compensator is inserted in each of the color channels. Specifically, each of phase compensators 131 to 133 for the respective color channels is arranged between the respective liquid crystal display device and the wire grid type of polarizing beam splitter in each color channel so that the phase compensation can be carried out, thus improving the contrast.

Each of these phase compensators 131 to 133 is formed into a phase compensating plate, called "C plate," in which the refraction index in a thickness direction perpendicular to the plate is set to be smaller than the refraction indices in a plate direction that is in parallel to the plate. In other words, the C plate is defined as a phase compensating plate that satisfies a condition of "nx=ny>nz," where nx and ny are primary refraction indices in mutually perpendicular directions along the plate direction and nz is a primary refraction index in the thickness direction.

Each of the blue(B)-channel phase compensator 131, the green(G)-channel phase compensator 132, and the red(R) phase compensator 133 is previously given an optimum phase difference for compensating for a phase difference in each wavelength band. AR (anti-reflection) coating is applied to the boundary face of each phase compensator 131 (to 133) to the air (i.e., the outer surface of each phase compensator), with the reflected light reduced.

In the first embodiment, FIG. 5 has been introduced to show the relationship between the cell thickness of a liquid crystal layer and the light output in the dark state. It has also been confirmed that making the cell thickness of a liquid crystal layer improves its characteristics including the disclination shown in FIG. 9 and a response speed. However, making the cell thickness too small will result in a very high voltage for driving the liquid crystal, thus making it difficult to produce the drive circuits. On the other hand, different types of liquid crystal require different drive voltages and provide different response speeds, so that optimum phase differences for phase compensators become different from each other.

Figure 26:
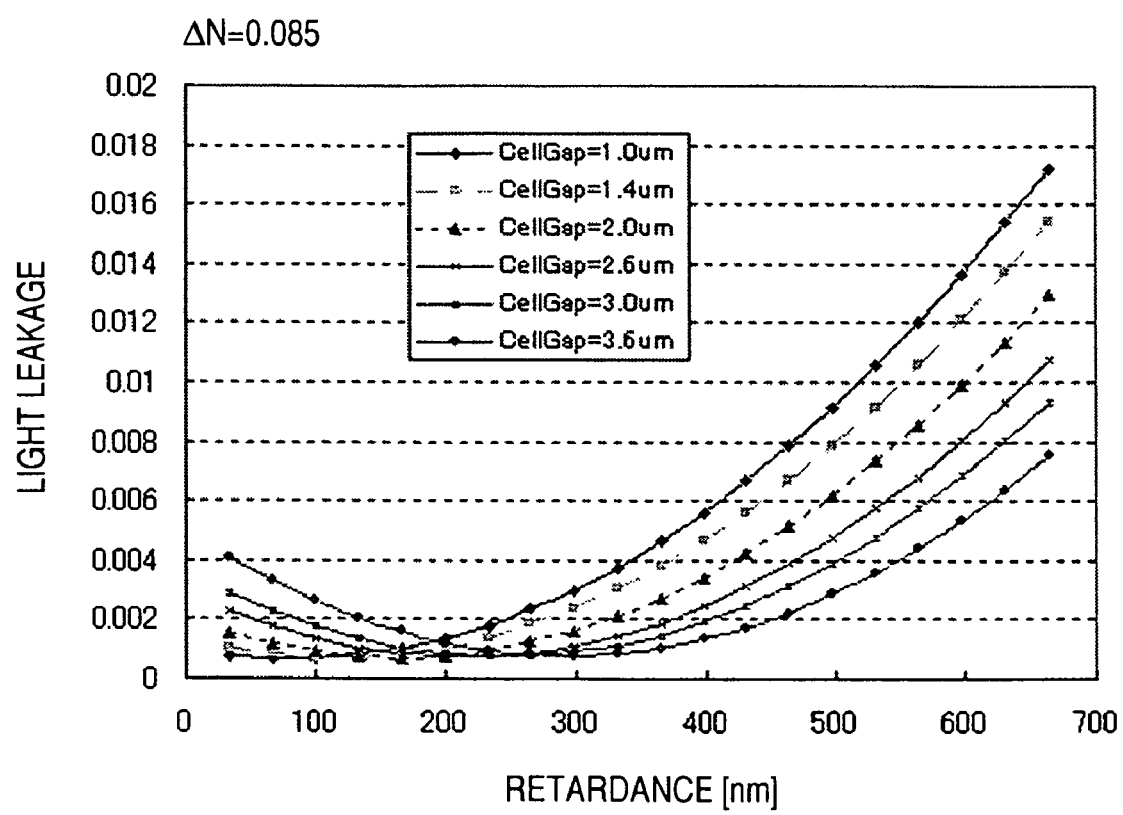
FIG. 26 is a graph showing the relationship between phase differences of a phase compensator and light leakage, wherein the double refraction index of a reflective liquid crystal display device is set to a specific value and the cell thickness thereof is assigned to a parameter to be changed.
Figure 27:
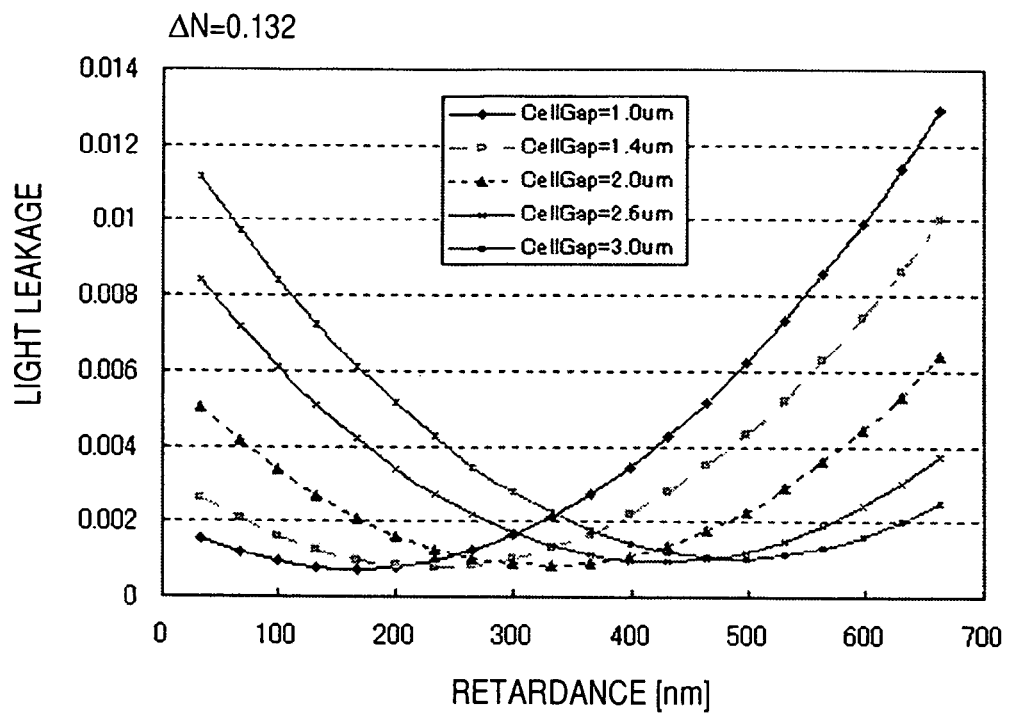
FIGS. 27 and 28 are graphs each showing the relationship between phase differences of the phase compensator and light leakage, wherein the double refraction index of a reflective liquid crystal display device is set to another specific value and the cell thickness thereof is assigned to a parameter to be changed.
Figure 28:
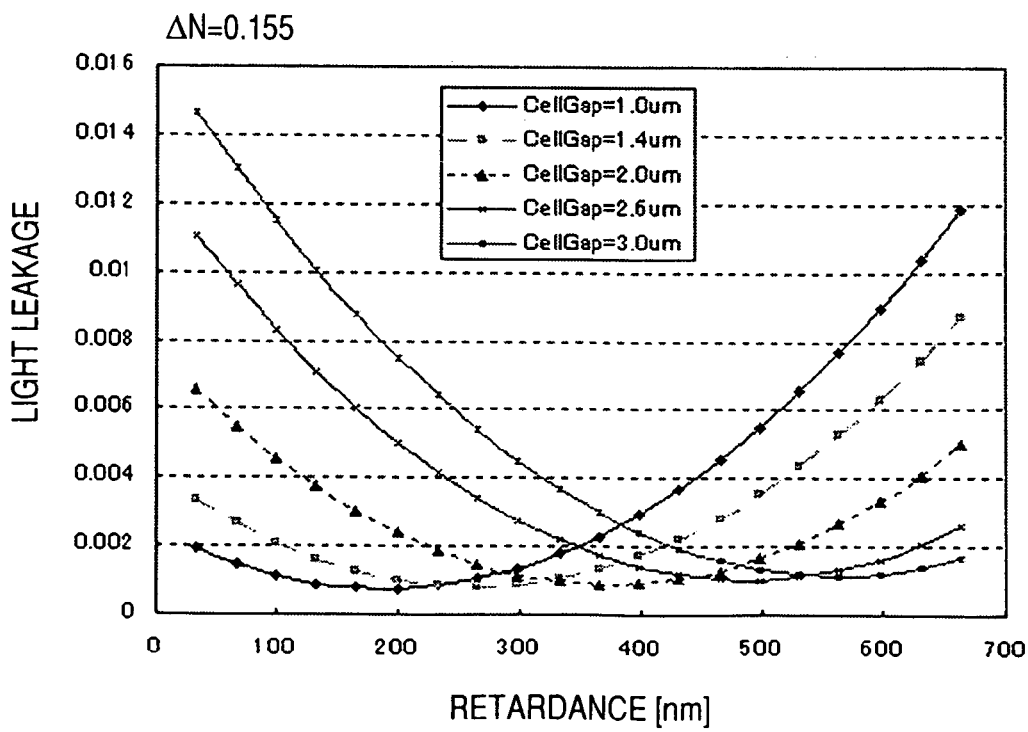

FIGS. 26, 27 and 28 concern with three types of liquid crystal of which double refraction indices Δn are mutually different (Δn=0.085, 0.132, 0.155) and, respectively, show the relationship between the phase difference for a phase compensator and the light leakage under the condition that each cell thickness d is taken as a parameter. As already described, with the twist angle φ independent of the double refraction index Δn and the cell thickness d, a twist angle φ of 120 degrees gives a minimum to the light output. However, the phase differences for phase compensators depends on the double refraction index Δn and the cell thickness d, because local minimum values of the curves showing the light leakage depend on those values Δn and d.

Figure 29:
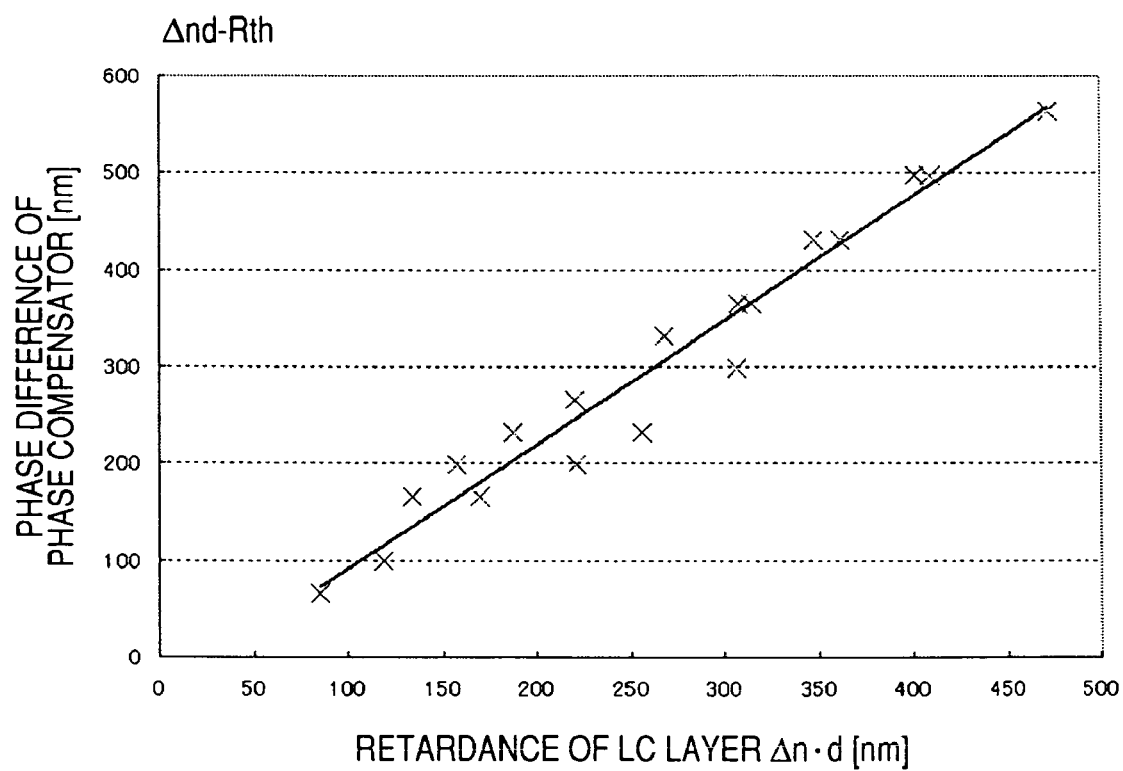
FIG. 29 is a graph showing the relationship between phase differences (retardances) Rth of the phase compensator providing a minimum in each of the curves shown in FIGS. 26-28 and retardations "Δn·d" of the liquid crystal layer, the relationship being obtained from the curves shown in FIGS. 26-28.

On the other hand, a retardation which is caused when the light passes a liquid crystal layer of a cell thickness d is expressed by "Δn·d." Hence when a phase difference (i.e., retardance) for the phase compensator, which provide a minimum value of each curve in FIGS. 26, 27 and 28, is expressed by Rth, the relationship between the retardance Rth and the value "Δn·d" can be shown in FIG. 29.

The graph in FIG. 29 shows that, when Δn·d=150 nm, an optimum phase difference Rth for the phase compensator is 200 nm and, when Δn·d=500 nm, an optimum phase difference Rth for the phase compensator is 600 nm When taking it consideration the irregularities of liquid crystal layers and phase compensators to be adopted in actual apparatuses, an optimum range of the phase difference Rth for the phase compensator is 100 to 650 nm for the values Δn·d of 150-500 nm. Furthermore, as for the values Δn·d of 300-400 nm, an optimum range of the phase difference Rth for the phase compensator is 300-500 nm.

As described, though the retardation Δn·d changes depending on the double refraction index Δn of liquid crystal and the cell thickness d thereof, the present embodiment enables use of a phase compensator of a best-suited phase difference, whereby the contrast of image being displayed can be improved more.

The projection display apparatus according to the third embodiment is able to provide high-contrast projected images by additionally using the phase compensator of the predetermined characteristics described above.

By the way, the structures described in both the second and third embodiments, that is, the collimator 20 and the phase compensator 16 may be brought into operation together.

Fourth Embodiment

Figure 30:
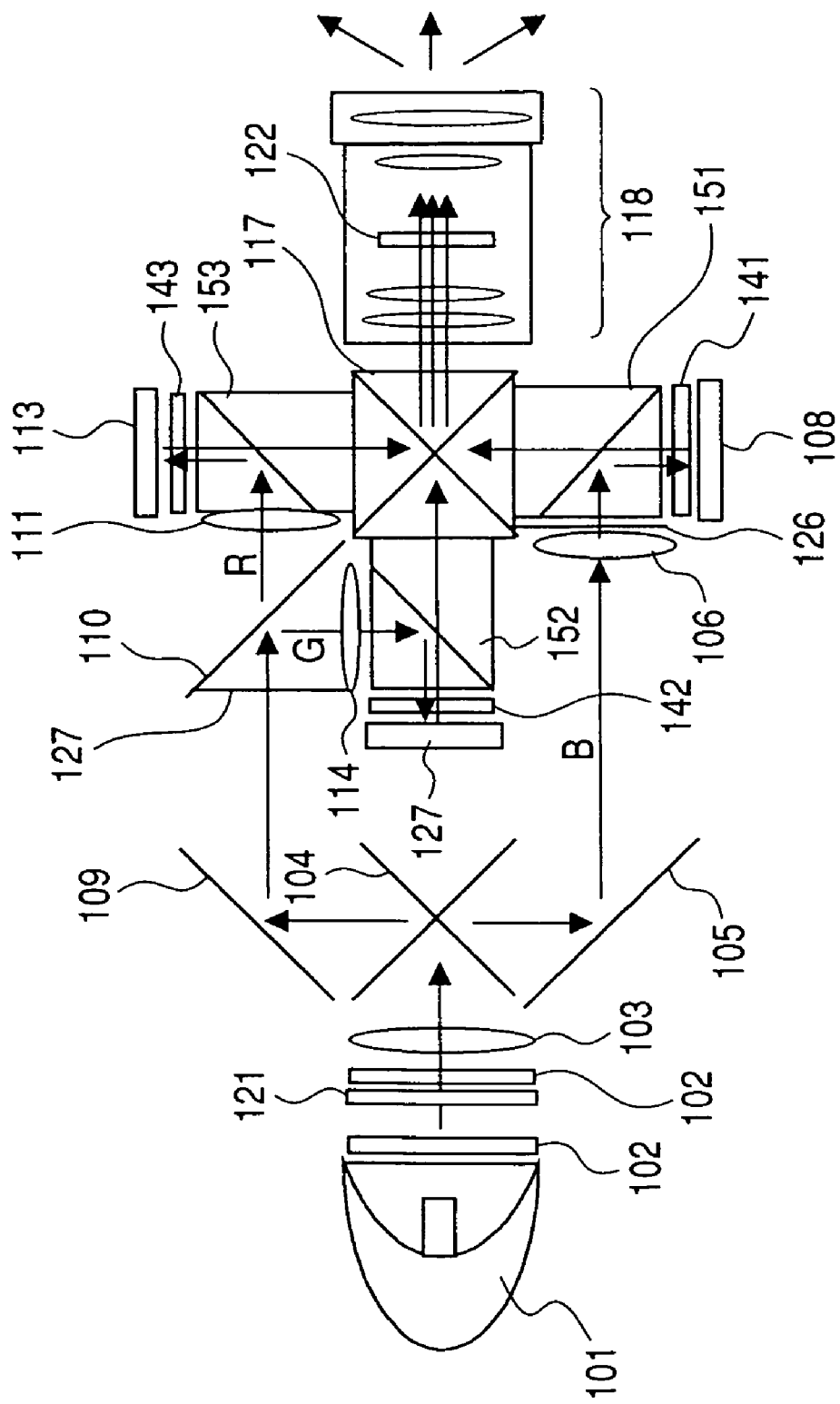
FIG. 30 is a schematic diagram outlining the optical configuration of a projection display apparatus according to a fourth embodiment of the present invention.
Figure 31A:
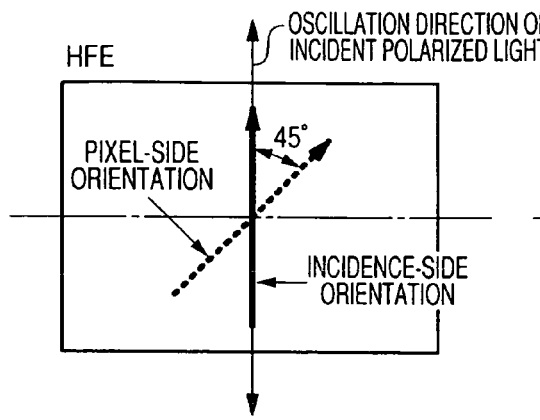
FIGS. 31A to 31D are illustrations each showing the operation mode of liquid crystal and an orientation method therefore, which are known conventionally.
Figure 31B:
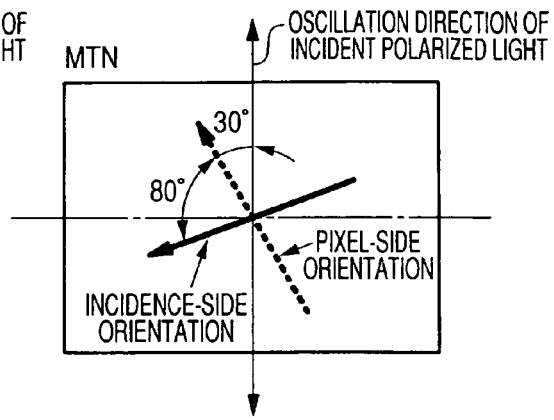
Figure 31C:
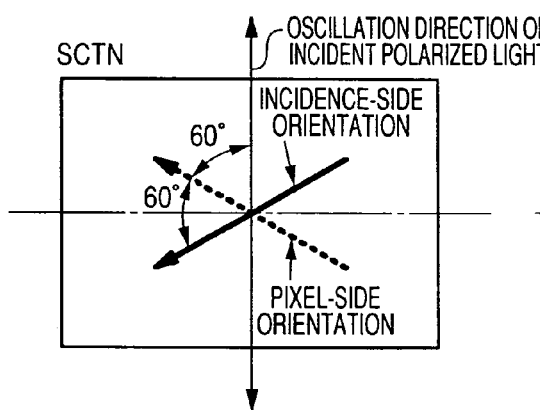
Figure 31D:
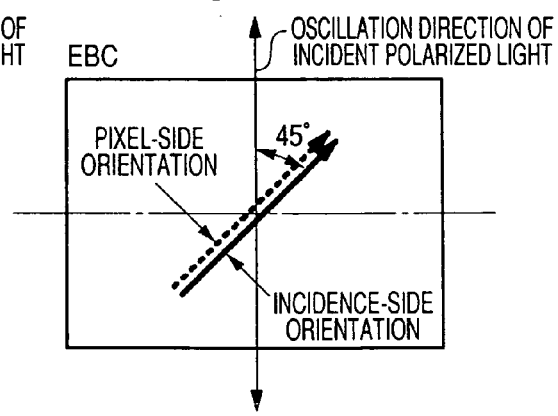
Figure 31E:
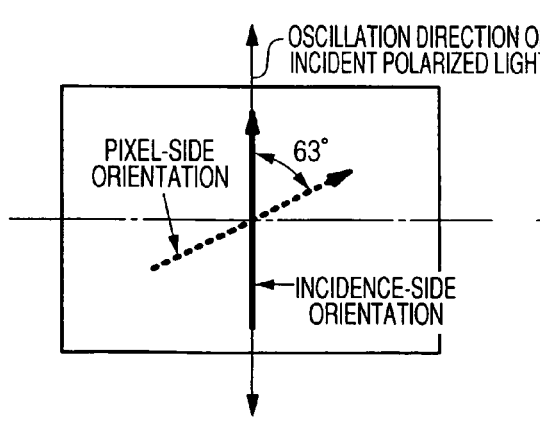
FIGS. 31E and 31F are illustrations each showing an orientation method for liquid crystal, which are known conventionally.
Figure 31F:
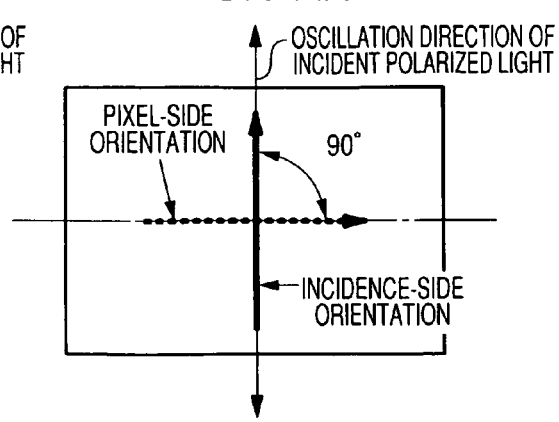
Figure 32:
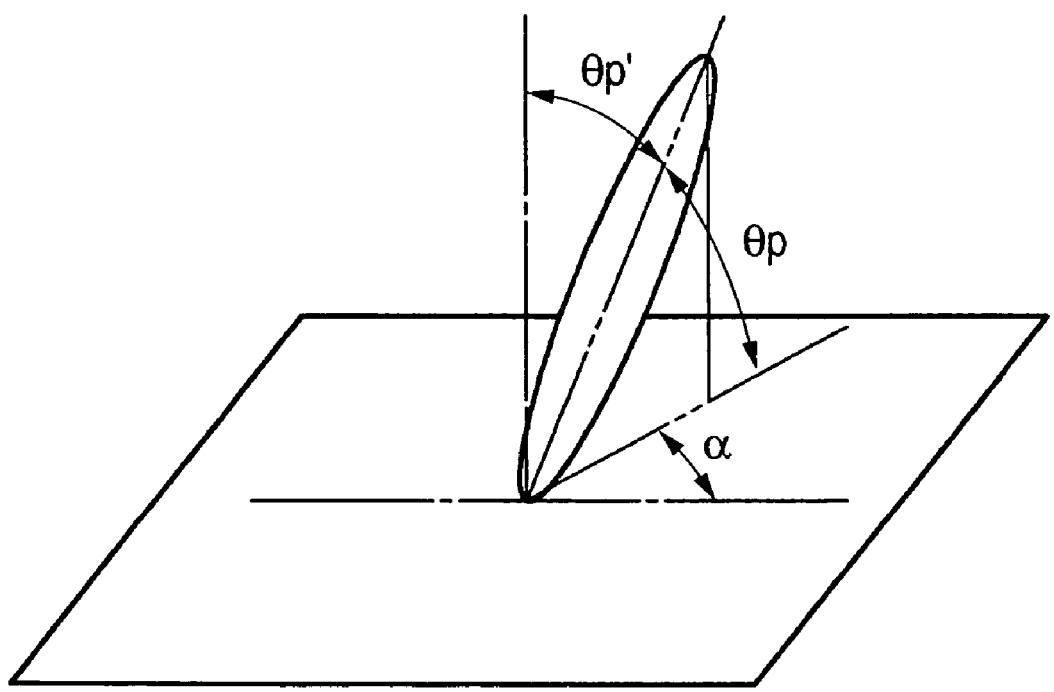
FIG. 32 illustrates the pre-tilt angle θp and azimuthal angle α of liquid crystal molecules.

Referring to FIG. 30, a projection display apparatus with a reflective liquid crystal display device will now be described, in which the projection display apparatus is according to a fourth embodiment of the present invention and is characteristic of use of another type of polarizing beam splatter.

As described, the projection display apparatus according to the foregoing embodiments adopts the wire grid type of polarizing beam splitter (WG-PBS) as the polarizing beam splitter (PBS) which is combined with the reflective liquid crystal display device reduced into practice according to the present embodiment. This combination realizes a higher contrast ratio compared with the conventional, as described.

However, such a combination is not a definitive list in the present invention. In cases where the wire grid type of polarizing beam splitter is not used, the foregoing liquid crystal display devices 108, 113 and 115 according to the present invention can still be combined with other types of polarizing beam splitters, although the performance cannot reach a level as high as the combination with the wire grid type of polarizing beam splitter, but is still higher than the conventional. By way of example, a MacNeille type of polarizing beam splitter, which has been used widely, can be adopted. In this case, it is not required to re-design the outer appearance of a conventional optical engine with the MacNeille type of polarizing beam splitter. The conventional optical engine can be used, provided the reflective liquid crystal display devices are exchanged, thus reducing production costs.

FIG. 30 is a plan view showing a projection display apparatus with such an optical engine. In this figure, for the same of a simplified explanation, the components which are the same or identical as or to those in FIGS. 15 and 16 of the second embodiment are given the same reference numerals.

In the projection display apparatus shown in FIG. 30, the components corresponding to those residing in a system extending from a light source to a color separation unit are similar to those in the second embodiment. Additionally, there are provided MacNeille type of polarizing beam splitters 151-153, to which polarizing planes composed of pre-polarizers 126 and 127 are applied as shown in FIG. 30, so that the beam splitters 151-153 receive S-polarized light. Each of the MacNeille type of polarizing beam splitters 151-153, which is composed of two prisms which are glued together, reflects the S-polarized light serving as the incident illuminating light. The reflected light (S-polarized) is transmitted to each of reflective liquid crystal display devices 108, 113 and 115 through each of phase compensators (e.g., quarter wave plates) 141-143 placed between.

The incident light is modulated in each of the display devices 108, 113, and 115 depending on images, and then the modulated light is reflected and returned to each of the beam splitters 151-153 again via each of the phase compensators 141-143. The returned light passes each of the beam splitters 151 and 153 so that the light is converted to P-polarized modulated light. The modulated light for each color is synthesized by the cross dichroic prism 117, and the synthesized light is projected to a screen by the projection lens 118.

Alternatively, the MacNeille type of polarizing beam splitter can be replaced by a Cartesian type of polarizing beam splitter.

The present invention may be embodied in several other forms without departing from the spirit thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A projection display apparatus comprising: a light source radiating light; an illuminating optical system receiving the light radiated by the light source; a polarizing beam splitter polarizing the radiated light through the optical system to produce polarized light and separating modulated light and non-modulated light; a reflective liquid crystal display device receiving the polarized light to modulate the received polarized light in response to image signals so that the modulated light is produced and returning the modulated light to the polarizing beam splitter; and a projection lens receiving the modulated light separated by the polarizing beam splitter to project the modulated light to a display plane on which an image is displayed, wherein the reflective liquid crystal display device comprises a first substrate receiving a perpendicular incidence of the polarized light, which is polarized by the polarizing beam splitter, and having a surface on which a transparent electrode is formed, the light being polarized by an optical system including a polarizing beam splitter; a second substrate being disposed in parallel to the second substrate with a space left between the first and second electrodes, having a surface on which both reflective electrodes and drive circuits for respective pixels are formed in a matrix, and causing modulated light to return to the optical system, both surfaces of the first and second substrates being opposed to each other; and a liquid crystal layer held between both surfaces of the first and second substrates, composed of nematic liquid crystal having negative dielectric anisotropy, and given a function of modulating the polarized light into the modulated light, wherein a first liquid crystal orientation direction on the first substrate is set to an angle rotated by "60+−α" degrees in a first rotating direction starting from a reference direction, and a second liquid crystal orientation direction on the second substrate is set to an angle rotated by "60+−β" degrees in a second rotating direction starting from the reference direction, the first and second rotating directions mutually oppositely rotating from the reference direction, the reference direction being parallel to the first and second substrates and being within an angular range defined as a central angle plus .+−0.5 degrees wherein the central angle is +−45 degrees from an oscillation direction of the polarized light entering each substrate, and a relationship of $|\alpha|+|\beta| \leq 10$ ($\alpha$ and $\beta$ are zero or positive integers) being fulfilled.

2. The projection display apparatus according to claim 1, comprising an aperture member is positioned at one or more positions selected from a first position in the illuminating optical system and a second position in the projection lens and formed to have an aperture through which the light generated by at least one of the illuminating optical system and the projection lens passes so as to narrow a range of the light in a diagonal direction of the aperture.

3. The projection display apparatus according to claim 1, comprising a phase compensator disposed between the reflective liquid crystal display device and the polarizing beam splitter.

4. The projection display apparatus according to claim 3, wherein the phase compensator is formed to (1) meet a condition of $nx=ny \geq nz$ wherein nx and ny are primary refraction indices of the liquid crystal display device in mutually-perpendicular directions in a plane of the phase compensator and nz is a primary refraction index of the liquid crystal display device in a thickness direction thereof and (ii) have a phase difference set to 100 to 650 nm, in a case where the retardation "Δnd" of the liquid crystal display device is 150 to 500 nm wherein Δn is a double index and d is a thickness of the liquid crystal layer.

5. The projection display apparatus according to claim 3, wherein the phase compensator is formed to (1) meet a condition of $nx=ny \geq nz$ wherein nx and ny are primary refraction indices of the liquid crystal display device in mutually-perpendicular directions in a plane of the phase compensator and nz is a primary refraction index of the liquid crystal display device in a thickness direction thereof and (ii) have a phase difference set to 300 to 500 nm, in a case where the retardation "Δnd" of the liquid crystal display device is 300 to 400 nm wherein Δn is a double index and d is a thickness of the liquid crystal layer.

6. The projection display apparatus according to claim 1, comprising an aperture member is positioned at one or more positions selected from a first position in the illuminating optical system and a second position in the projection lens and formed to have an aperture through which the light generated by at least one of the illuminating optical system and the projection lens passes so as to narrow a range of the light in a diagonal direction of the aperture; and a phase compensator disposed between the reflective liquid crystal display device and the polarizing beam splitter.

7. The projection display apparatus according to claim 1, wherein the polarizing beam splitter is a polarizing beam slitter with a wire grid.

8. The projection display apparatus according to claim 1, wherein the liquid crystal layer has a thickness of 3.5 µm or less in a mutually opposed direction of the first and second substrates and molecules having a pre-tilt angle selected from a range of 75 to 85 degrees, the pre-tilt angle being given as an angle made between each molecule and the surfaces of the first and second substrates.

9. The projection display apparatus according to claim 1, wherein the liquid crystal layer has a thickness of 2.6 µm or less in a mutually opposed direction of the first and second substrates and molecules having a pre-tilt angle selected from a range of 75 to 87 degrees, the pre-tilt angle being given as an angle made between each molecule and the surfaces of the first and second substrates.

10. The projection display apparatus according to claim 1, wherein the liquid crystal layer has a thickness of 2 μm or less in a mutually opposed direction of the first and second substrates and molecules having a pre-tilt angle selected from a range of 75 to 88 degrees, the pre-tilt angle being given as an angle made between each molecule and the surfaces of the first and second substrates.

* * * * *

UNITED STATES PATENT AND TRADEMARK OFFICE
CERTIFICATE OF CORRECTION

PATENT NO.        : 7,773,163 B2
APPLICATION NO.   : 12/457722
DATED             : August 10, 2010
INVENTOR(S)       : Shimizu et al.

It is certified that error appears in the above-identified patent and that said Letters Patent is hereby corrected as shown below:

Column 23, Line 55:
"ond substrate being disposed in parallel to the second sub-" should read:
"ond substrate being disposed parallel to the first sub-"

Column 23, Line 56:
"strate with a space left between the first and second elec-" should read:
"strate with a space left between the first and second sub-"

Column 23, Line 57:
"trodes, having a surface on which both reflective electrodes" should read:
"strates, having a surface on which both reflective electrodes"

Column 24, Line 8:
"angle plus .+-0.5 degrees wherein the central angle is +-45" should read:
"angle plus +-0.5 degrees wherein the central angle is +-45"

Column 24, Line 13:
"comprising an aperture member is positioned at one or more" should read:
"comprising an aperture member positioned at one or more"

Column 24, Line 47:
"comprising an aperture member is positioned at one or more" should read:
"comprising an aperture member positioned at one or more"

Column 24, Line 58:
"slitter with a wire grid." should read:
"splitter with a wire grid."

Signed and Sealed this

Thirtieth Day of November, 2010

David J. Kappos
*Director of the United States Patent and Trademark Office*